(12) United States Patent
Clare et al.

(10) Patent No.: US 10,144,815 B2
(45) Date of Patent: Dec. 4, 2018

(54) MODIFIED NANO-CLAYS AND COATING COMPOSITIONS INCLUDING THE SAME

(71) Applicant: Portland State University, Portland, OR (US)

(72) Inventors: Tami L. Clare, Portland, OR (US); Natasja A. Swartz, Portland, OR (US)

(73) Assignee: Portland State University, Portland, OR (US)

( * ) Notice: Subject to any disclaimer, the term of this patent is extended or adjusted under 35 U.S.C. 154(b) by 55 days.

(21) Appl. No.: 15/278,882

(22) Filed: Sep. 28, 2016

(65) Prior Publication Data

US 2017/0088697 A1  Mar. 30, 2017

Related U.S. Application Data

(60) Provisional application No. 62/234,511, filed on Sep. 29, 2015.

(51) Int. Cl.
| | |
|---|---|
| *C08K 9/06* | (2006.01) |
| *C09D 5/08* | (2006.01) |
| *C09D 133/12* | (2006.01) |
| *C09D 127/16* | (2006.01) |

(Continued)

(52) U.S. Cl.
CPC .................. *C08K 9/06* (2013.01); *C09C 1/42* (2013.01); *C09D 5/08* (2013.01); *C09D 127/16* (2013.01); *C09D 133/12* (2013.01); *C01P 2002/72* (2013.01); *C01P 2002/82* (2013.01); *C01P 2002/85* (2013.01); *C01P 2004/51* (2013.01); *C01P 2004/52* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 4,141,873 A * | 2/1979 | Dohany | C09D 127/16 524/107 |
| 6,776,834 B2 * | 8/2004 | Sirejacob | C03C 17/30 106/287.1 |
| 7,691,932 B2 | 4/2010 | Nelson et al. | |

(Continued)

FOREIGN PATENT DOCUMENTS

| | | | |
|---|---|---|---|
| CN | 102874825 A * | 1/2013 | |
| CN | 104177738 A | 12/2014 | |

(Continued)

OTHER PUBLICATIONS

Machine translation of WO 01/48098 A1, retrieved Jan. 2018 (Year: 2018).*

(Continued)

*Primary Examiner* — Nicole M. Buie-Hatcher
(74) *Attorney, Agent, or Firm* — Klarquist Sparkman, LLP

(57) ABSTRACT

Modified nano-clays and coating compositions including the modified nano-clays are disclosed. The coating compositions are useful for protecting objects such as outdoor sculptures and architectural elements made of metal or including metal components. In some embodiments, the modified nano-clay is LAPONITE clay that has been covalently modified with (tridecafluoro-1,1,2,2-tetrahydrooctyl)triethoxysilane and cation-exchanged with phosphorylcholine.

8 Claims, 10 Drawing Sheets
(1 of 10 Drawing Sheet(s) Filed in Color)

(51) Int. Cl.
*C09C 1/42* (2006.01)
*C09C 3/12* (2006.01)

(52) U.S. Cl.
CPC .... *C01P 2004/64* (2013.01); *C08K 2201/005* (2013.01); *C08K 2201/011* (2013.01); *C09C 3/12* (2013.01)

(56) References Cited

U.S. PATENT DOCUMENTS

| | | | |
|---|---|---|---|
| 8,865,826 B2 | 10/2014 | Su et al. | |
| 2002/0160207 A1* | 10/2002 | Kohmura | B01J 20/103 428/446 |
| 2010/0215894 A1* | 8/2010 | Iverson | B82Y 30/00 428/87 |
| 2012/0037850 A1* | 2/2012 | Lee | C09K 11/7734 252/301.36 |
| 2012/0115009 A1 | 5/2012 | Okuno et al. | |
| 2012/0164050 A1* | 6/2012 | Yang | B82Y 30/00 423/265 |
| 2013/0090417 A1* | 4/2013 | Lin | C09D 127/16 524/263 |

FOREIGN PATENT DOCUMENTS

| | | |
|---|---|---|
| WO | WO-0148098 A1 * 7/2001 | ........... C09C 1/3081 |
| WO | WO 2011/121078 A1 | 10/2011 |
| WO | WO 2013/014546 A2 | 1/2013 |
| WO | WO 2013/126490 A1 | 8/2013 |
| WO | WO 2014/071144 A1 | 5/2014 |
| WO | WO 2014/086906 A1 | 6/2014 |

OTHER PUBLICATIONS

Clare et al. "Protecting material cultural heritage using waterborne, weatherable coatings containing polyvinylidene fluoride", Abstracts of Papers, 248th ACS National Meeting & Exposition, San Francisco, CA, United States, Aug. 10-14, 2014 (204), PMSE-18. (Year: 2014).*

Machine translation of CN 102874825 A, retrieved Jun. 2018 (Year: 2018).*

Clare et al., "Characterization of High Performance Protective Coatings for Use on Culturally Significant Works," *Intelligent Coatings for Corrosion Control*, eds. Tiwari et al., Butterworth-Heinemann, published Oct. 25, 2014, chapter proof and cover page, 34 pages.

Huttunene-Saarivirta et al., "Characterization and corrosion protection properties of epoxy powder coatings containing nanoclays," *Progress in Organic Coatings*, Apr. 2013, 76(4):757-767, Abstract only.

Swartz et al., "Minimizing Corrosion of Outdoor Metalworks Using Dispersed Chemically Stabilized Nanoclays in Polyvinylidene Fluoride Latex Coatings," *ACS Omega* 2016, 1:138-147.

Tong, "Water-based suspension of Polymer Nanoclay Composite Prepared via Miniemulsion Polymerization," School of Chemical and Biomolecular Engineering, *Georgia Institute of Technology*, Dec. 2007, 179 pages.

* cited by examiner

MODIFIED NANO-CLAYS AND COATING COMPOSITIONS INCLUDING THE SAME

CROSS REFERENCE TO RELATED APPLICATION

This application claims the benefit of U.S. Provisional Application No. 62/234,511, filed Sep. 29, 2015, which is incorporated in its entirety herein by reference.

ACKNOWLEDGMENT OF GOVERNMENT SUPPORT

This invention was made with government support under award numbers 0936752 and 1139230 awarded by the National Science Foundation. The government has certain rights in the invention.

FIELD

Embodiments of modified nano-clays and coating compositions comprising the modified nano-clays are disclosed.

BACKGROUND

With protective coatings, it is possible to reduce corrosion of metalworks, such as bridges, architectural elements and sculptures, by preventing or slowing the passage of water and ions to the metal substrate. Protective coatings may be pigmented; and pigment particles can further slow mass transport of corrosives through films. However, the use of optically transparent coatings is preferable when the ability to see the substrate is a feature for aesthetic and preventative maintenance reasons.

Previous work has shown that polymeric coatings containing polyvinylidene fluoride (PVDF) have longer working lifetimes than polyacrylics and other polymers, due to excellent chemical and thermal stability (Clare et al., Proceedings of Metal 07: Interim Meeting of the ICOM-CC Metal WG Rijksmuseum, Amsterdam, Degrigny, C.; Lang, R. V.; Joosten, I.; Ankersmith, B., Eds. ICOM, 2007: Rijksmuseum, Amsterdam, 2007, 83-87; Iezzi et al., Prog. Org. Coat 2000, 40(1-4):55-60; Wood, Prog. Org. Coat 2014, 77(12)2140-2146; Zhou et al., Adv. Func. Mater. 2013, 23(13):1664-1670). Yet, it has also been shown that water uptake into films produced from waterborne latex coatings is greater than films produced from solvent-based coatings, due to voids in the film caused by defects in spherical close-packing, resulting in a measurable decrease in the films' barrier properties and visible water-whitening of the transparent film (Swartz et al., Prog. Org. Coat. 2012, 75(3):215-223).

SUMMARY

This disclosure concerns modified nano-clays and coating compositions including the modified nano-clays. The coating compositions are useful for protecting objects, such as metal sculptures and architectural elements made of metal or including metal components, from deleterious effects (e.g., corrosion) produced by exposure, for instance to the weather.

Embodiments of the modified nano-clays are covalently modified with silanes. The nano-clay may be a natural or synthetic nano-clay. In some examples, the nano-clay is LAPONITE clay.

Exemplary silanes include haloalkyl silanes and acetoxy silanes. In some embodiments, the silane is ahaloalkylalkoxysilane, such as a fluoroalkylalkoxy-silane. In certain embodiments, the silane is (tridecafluoro-1,1,2,2-tetrahydrooctyl) triethoxysilane (FOTES). The FOTES-modified nano-clay may further be covalently modified with an acetoxy silane, such as an acetoxyalkylalkoxysilane. For example, the FOTES-modified nano-clay may be further modified with 3-acetoxypropyltrimethoxy-silane (APTMS).

In some embodiments, the covalently modified nano-clay is cation exchanged, such that the nano-clay includes a plurality of ionically bonded polyatomic ions. In certain embodiments, the ionically bonded polyatomic ions are quaternary amines, such as phosphorylcholine.

Embodiments of the disclosed modified nano-clays are useful in coating compositions. In some embodiments, the coating composition includes polyvinylidene fluoride (PVDF). The coating composition may further comprise poly(methyl methacrylate) (PMMA). Advantageously, the coating composition may be an aqueous dispersion of PVDF, PMMA, and the modified nano-clay.

When applied to an object, the coating compositions provide a protective coating. Embodiments of the disclosed protective coatings provide superior protection (e.g., greater impedance, lower electrochemical stress index, reduced water uptake, reduced mass transport, reduced photodegradation, reduced surface ablation, reduced UV degradation, and combinations thereof) compared to conventional solvent-based protective coatings or aqueous PVDF/PMMA coatings that do not include an embodiment of the disclosed modified nano-clay.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9D shows partitioning of the film at advanced weathering times with a new time constant for a percolation layer.

FIGS. 13A and 13C are white light images of the cross-sections. FIGS. 13C and 13F are color Raman maps in which the intensity ratios of key PVDF/acrylic stretching bands are plotted ($I_{885}/I_{1730}$). FIGS. 13B and 13E show the Raman maps superimposed over white light images of the cross-sections.

DETAILED DESCRIPTION

Figure 1A:
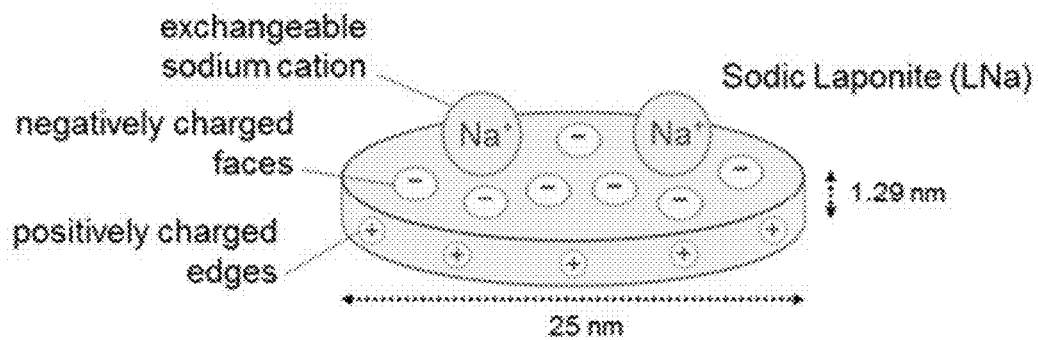
FIG. 1A is a schematic diagram of a typical platelet of LAPONITE clay.

Nano-clays are small enough to appear optically transparent, yet they have large surface-to-volume and high aspect ratios that can significantly inhibit water diffusion when incorporated into films. Clear coatings are commonly applied onto outdoor metalworks, such as sculptures, to prevent corrosion, while minimally affecting the aesthetics of the work. In recent years, waterborne rather than solvent-based clear coatings are increasingly used in many applications to reduce the volatile organic components in the formulation, yet the performance of dry films produced from waterborne colloidal suspensions is generally poorer. Mechanical strain due to increased hardness in composite films may result in film cracking upon drying and/or weathering; and latex packing defects may increase the water volume fraction of the material. Other voids and defects may exist or be produced over time from the loss or surface-migration of inorganic fillers (such as pigments). While there are both environmental and cost motivations to produce films from water-borne colloidal polymeric dispersions, the resulting films are more permeable to water due to their chemistry and their film formation mechanism. Adsorption of water droplets in voids that are sufficiently large to scatter white light, will whiten transparent films.

This disclosure concerns embodiments of modified nano-clays, which improve the barrier properties (both into and out of) of coating compositions, such as aqueous acrylic/polyvinylidene fluoride (PVDF) emulsion. Clay-polymer compatibility is increased by covalent modification of the clay and/or by cation exchange. In some embodiments, the clay is the synthetic nano-clay LAPONITE clay.

Incorporation of the disclosed modified nano-clays into a coating composition slows diffusion of ions through the coating to the metal substrate. Composite films including the modified nano-clays showed many improved properties, such as reduced water sensitivity and/or UV degradation. The composite films also demonstrated improved barrier properties and diffusion constants over both short and long term weathering studies compared to films without nano-clays. The diffusion constant measured for the highest performing composite film showed that the performance gap between relevant water- and solvent-borne coatings used to protect outdoor metals was narrowed by half.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context if properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Alkoxy: A radical (or substituent) having the structure —OR, where R is a substituted or unsubstituted alkyl. The term lower alkoxy means that the alkyl chain includes 1-10 carbon atoms.

Alkyl: A hydrocarbon group having a saturated carbon chain. The chain may be cyclic, branched or unbranched. The term lower alkyl means the chain includes 1-10 carbon atoms.

Acetoxyalkylalkoxysilane: A silane having the general formula:

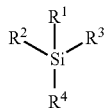

wherein at least one of $R^1$-$R^4$ is acetoxyalkyl, and the others of $R^1$-$R^4$ are substituted or unsubstituted alkoxy.

Alkylalkoxysilane: A silane having the general formula:

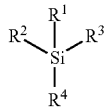

wherein at least one of $R^1$-$R^4$ is substituted or unsubstituted alkyl, and the others of $R^1$-$R^4$ are substituted or unsubstituted alkoxy.

APTMS: 3-acetoxypropyltrimethoxysilane

Cation exchange agent: As used herein, the term "cationic exchange agent" refers to a polyatomic cation capable of displacing a metal cation from a nano-clay.

Clay: A natural or synthetic layered mineral silicate. Many clays are aluminosilicates with sheet-like layered structure of silica ($SiO_4$) tetrahedra bonded to alumina ($AlO_6$) octahedra in a variety of ratios and configurations. Other metals, such as magnesium, may replace the aluminum in the crystal structure. Layers of clay are referred to as platelets. Clay platelets include multiple unit cells and have a high aspect ratio (ratio of diameter to height), such as an aspect ratio greater than 15. Some clays have aspect ratios greater than 100, such as from 1000-1500. Platelets may form multilayer stacks including from 10s to 1000s of platelets. Clays generally are hydrophilic and may include hydroxyl groups along the platelet edges.

Dispersion: A two-phase system in which particles are distributed throughout a continuous phase of a different composition.

Exfoliation: The separation of a clay platelet stack into smaller stacks and/or individual platelets.

FOTES: (tridecafluoro-1,1,2,2-tetrahydrooctyl) triethoxysilane

FTIR-ATR: Fourier transform infrared spectroscopy-attenuated total reflectance

Grafting efficiency: As used herein, the term "grafting efficiency" refers to the ratio of siloxy moieties to available hydroxyl groups on the edge surface of the nano-clay platelet. Grafting efficiency may be expressed as a unitless number or as a percentage. For example, a grafting efficiency of 0.8 or 80% indicates that there are 80 siloxy moieties per 100 accessible hydroxyl groups.

LA: APTMS-modified LAPONITE clay.

LAPc: LAPONITE clay modified with APTMS and Pc

LAPONITE clay: A nano-clay having a unit cell formula of $Na_{0.7}[(Si_8Mg_{5.5}Li_{0.3})O_{20}(OH)_4]$. A typical 25×1.29 nm platelet, abbreviated as LNa, contains approximately 1000 unit cells per discoid.

Latex: As used herein, "latex" refers to a synthetic product comprising an aqueous dispersion of polymer particles, typically used to make paints, coatings, and the like.

LF: FOTES-modified LAPONITE clay.

LFPc: LAPONITE clay modified with FOTES and Pc

LNa: Sodic LAPONITE clay, a platelet of LAPONITE clay including sodium cations.

Modified: As used here, the term "modified" refers to substance, such as a mineral clay, that has been chemically and/or structurally altered by covalent and/or ionic binding of molecules to its surface.

Moiety: As used herein, the term "moiety" refers to a fragment of a molecule, such as a functional group within the molecule or the fragment of a molecule remaining after a chemical reaction.

Nano-clays: A natural or synthetic clay with nanoparticle-sized platelets. Nano-clays are characterized by chemical composition and nanoparticle morphology. Exemplary nano-clays include, but are not limited to, LAPONITE clay, montmorillonite, bentonite, kaolinite, hectorite, and halloysite.

Nanoparticle: A nanoscale particle with a size that is measured in nanometers, for example, a nanoscopic particle that has at least one dimension of less than about 100 nm.

Pc: phosphorylcholine (phosphocholine chloride calcium salt tetrahydrate)

PEA: poly(ethyl acrylate)

PMMA: poly(methyl methacrylate)

PNC: polymer nanocomposite

PVDF: polyvinylidene fluoride

SAXS: small-angle X-ray scattering

Smectite: A group of phyllosilicate mineral species, including natural clays such as montmorillonite, beidellite, nontronite, saponite, and hectorite. LAPONITE clay is a synthetic smectite.

Substituent: An atom or group of atoms that replaces another atom in a molecule as the result of a reaction. The term "substituent" typically refers to an atom or group of atoms that replaces a hydrogen atom, or two hydrogen atoms if the substituent is attached via a double bond, on a parent hydrocarbon chain or ring. Exemplary substituents include, for instance, alkyl, alkenyl, alkynyl, alkoxy, alkylamino, alkylthio, acyl, aldehyde, amido, amino, aminoalkyl, aryl, arylalkyl, arylamino, carbonate, carboxyl, cyano, cycloalkyl, dialkylamino, halo, haloaliphatic (e.g., haloalkyl), haloalkoxy, heteroaliphatic, heteroaryl, heterocycloaliphatic, hydroxyl, oxo, sulfonamide, sulfhydryl, thio, and thioalkoxy groups.

Substituted: A fundamental compound, such as an aryl or aliphatic compound, or a radical thereof, having coupled thereto one or more substituents, each substituent typically replacing a hydrogen atom on the fundamental compound.

WAXD: wide-angle X-ray diffraction

II. MODIFIED NANO-CLAYS

A nano-clay is a natural or synthetic layered mineral silicate with nanoparticle-sized platelets. Nano-clays are characterized by composition and by nanoparticle morphology (e.g., discoid, nanotube, Nano rod, etc.) For example, LAPONITE clay ($Na_{0.7}[(Si_8Mg_{5.5}Li_{0.3})O_{20}(OH)_4]$), a synthetic smectite clay, has a discoid morphology with platelets having a thickness of 1.29 nm and a diameter of 25 nm. Bentonite ($Na_{0.33}[Al_{1.67}Mg_{0.33}]Si_4O_{10}[(OH)_2]$), a natural smectite, also has a discoid morphology, but much larger platelets with a thickness of 1 nm and a diameter of 800 nm. Hectorite ($Na_{0.33}[Mg_{2.67}Li_{0.33}]Si_4O_{10}[OH_2]$), another natural smectite, has an elongated nanorod morphology with dimensions of 800 nm×80 nm×1 nm. Nano-clays suitable for use in the disclosed compositions have platelets with surface hydroxyl groups and a largest dimension ≤50 nm, such as ≤40 nm or ≤30 nm. In some embodiments, the largest dimension of the nano-clay platelet is 20-30 nm.

In general, clays have high aspect ratios (diameter to thickness), large surface areas, and charged surfaces. They are often used as a rheology modifiers because the charged interfaces act to control diffusion in wet suspensions and as such have been used to create a range of phases from sols to gels and charged glasses. LAPONITE clay, as well as other smectite clays, have a concentration dependent phase diagram where the amount, pH and dielectric constant of the bulk solvent play an integral role in inhibiting or facilitating particle interactions. These factors also affect the electrostatic interactions when the clay is added to a colloidal organic polymer suspension. The density and organization of the charges around the particle and thickness of the slipping plane can be measured by the zeta potential, where high potentials (large in absolute magnitude) lead to particle repulsion and low potentials (small in absolute magnitude) lead to flocculation due to small slipping planes that are overcome by attractive forces.

Figure 1B:
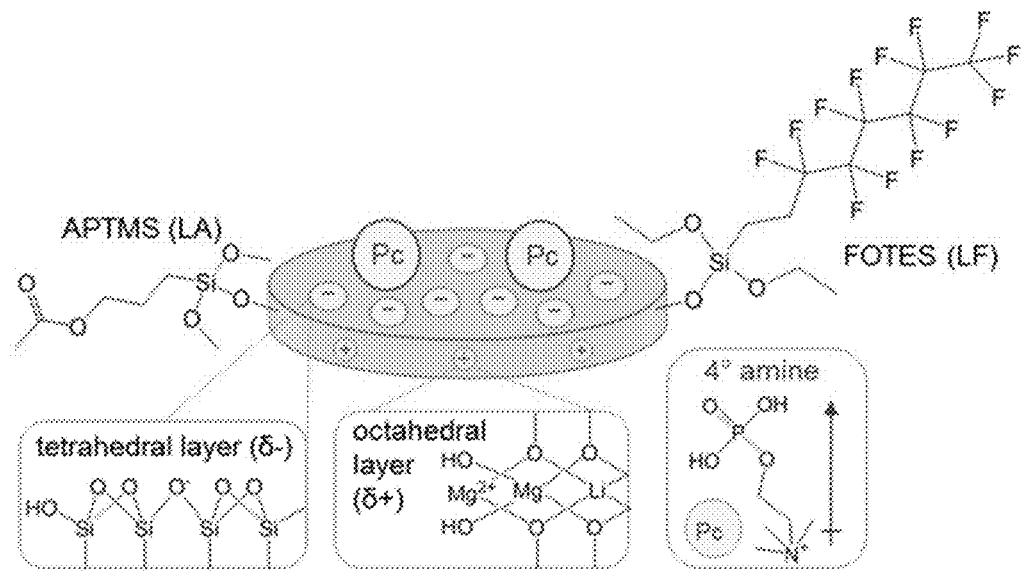
FIG. 1B is a schematic diagram of a LAPONITE clay platelet showing surface modification by covalent attachment of 3-acetoxypropyltrimethoxysilane (APTMS) and (tridecafluoro-1,1,2,2-tetrahydrooctyl) triethoxysilane (FOTES) at the tetrahedral edge, with ionic exchange on the face with phosphorylcholine (Pc). These modifications are each optional, and may be made singly or in any combination.

In some embodiments, the nano-clay is LAPONITE clay. A typical 25×1.29 nm platelet of LAPONITE clay includes approximately 1000 unit cells per discoid, or platelet (FIG. 1A). The chemical composition of LAPONITE clay ($Na_{0.7}[(Si_8Mg_{5.5}Li_{0.3})O_{20}(OH)_4]$) creates a 2:1 particle with one octahedrally coordinated magnesium/lithium oxide sheet sandwiched between two tetrahedrally coordinated silica sheets and one interlayer cationic sheet of $Na^+$ ions and water molecules for charge balance. LAPONITE clay platelets have an aspect ratio (diameter to thickness) of 25 and a large surface area of 350 $m^2$/g. The size and shape of the individual platelet has been well characterized by powder diffraction as a disc-shaped with a thickness of 1.29 nm in ambient conditions, a discrepancy with the smaller chemical structure (1.08 nm thick) that is caused by water sorption within the clay. At near-neutral pH's, expansion of sodium cations out of the interlayer space induces a negatively charged face and partial positive charge along the edge of the platelet as depicted. The mobile interlayer sodium cations encourage the clay to swell in water producing exfoliated (individual) 3-layered (tetrahedral:octahedral:tetrahedral, or T:O:T) inorganic sheets with the morphology of a platelet Like many clays, LAPONITE clay is highly modifiable in that it has both accessible hydroxyl groups available for silanation on the sheet's broken edge, and exchangeable sodium cations connecting the faces particle-to-particle Embodiments of the disclosed modified nano-clays are covalently modified with acetoxy silanes, haloalkyl silanes, or a combination thereof. Covalent modification of LAPONITE clay nano-clays with a silane occurs via a reaction between the hydroxyl groups on the edge of the clay sheet and a silane to produce covalent bonds, as illustrated by the products depicted in FIG. 1B where APTMS or FOTES silanes are shown bound to the LAPONITE clay edges. Ionic exchange on the face with a cationic exchange agent (e.g., phosphoryl choline) also can be performed to increase hydrophilicity of the covalently-modified nano-clay (FIG. 1B). Surface modification alters the relative strength of stacking (attractive) versus dispersive (repulsive) forces to influence dispersability of platelets in aqueous compositions.

In some embodiments, the nano-clay is covalently modified with a haloalkylalkoxysilane and/or an acetoxyalkylalkoxysilane to provide a plurality of haloalkylalkoxysiloxy and/or acetoxyalkylalkoxysiloxy moieties covalently bonded to a first surface of the nano-clay platelet. The silane has a general formula:

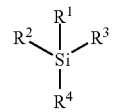

wherein $R^1$ is haloalkyl or acetoxyalkyl and $R^2$-$R^4$ are alkoxy. In one embodiment, $R^1$ is fluoroalkyl, such as a $C_1$-$C_{10}$ fluoroalkyl, and $R^2$-$R^4$ are lower alkoxy, such as $C_1$-$C_4$ alkoxy or $C_1$-$C_3$ alkoxy. In an independent embodiment, $R^1$ is acetoxyalkyl wherein the alkyl is a $C_1$-$C_{10}$ alkyl or a $C_1$-$C_5$ alkyl, and $R^2$-$R^4$ are lower alkoxy, such as $C_1$-$C_4$ alkoxy or $C_1$-$C_3$ alkoxy. Exemplary silanes include (tridecafluoro-1,1,2,2-tetrahydrooctyl)triethoxysilane (FOTES) and 3-acetoxypropyltrimethoxysilane (APTMS).

The silane reacts with hydroxyl groups on the nano-clay to provide covalently bonded siloxy moieties having a general formula:

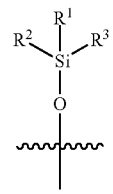

wherein $R^1$-$R^3$ are as previously defined.

The extent of the covalent modification is referred to as the "grafting efficiency." The grafting efficiency is the ratio of siloxy moieties to available hydroxyl groups on the edge surface of the nano-clay platelet. Grafting efficiency may be expressed as a unitless number or as a percentage. Grafting efficiency may be determined but any suitable method, such as by X-ray photoelectron spectroscopy or Raman spectroscopy. In some embodiments, the grafting efficiency is at least 20%, at least 50%, at least 75%, or even greater than 100%. A grafting efficiency greater than 100% indicates cross-linking between silane molecules in addition to covalent binding to the platelet.

In some embodiments, cation exchange is performed on the nano-clay to replace at least some metal cations on the face surfaces with a cation exchange agent. For example, at least some of the sodium cations on a LAPONITE clay platelet are displaced by cation exchange agent. In some embodiments, the cation exchange agent is a quaternary amine, guanidine derivative, or phosphonium surfactant. Exemplary quaternary amines include, but are not limited to, phosphorylcholine chloride (e.g., phosphocholine chloride calcium salt tetrahydrate, Pc), a zwitterionic phosphorylcholine monomer (e.g. 2-methacryloyloxyethyl phosphorylcholine MPC), and choline alfoscerate (e.g. L-α-glycerophosphorylcholine, alpha-GPC). Exemplary guanidines include, but are not limited to, amino acid arginine, creatine (e.g. 2-[carbamimidoyl(methyl)amino]acetic acid), and triazabicyclodecene. Exemplary phosphonium surfactants include, but are not limited to, tetramethyl phosphonium chloride and (2-dimethylaminoethyl)triphenylphosphonium bromide. The cation exchange agents typically are larger than the sodium cations that are replaced and desirably are electrostatically compatible with Pc in water. Cation exchange may stabilize the covalently modified nano-clays (e.g., by preventing platelet agglomeration) and facilitate exfoliation in water. In some embodiments, cation exchange is partial. For example, up to 500 sodium cations per platelet may be exchanged.

In one embodiment, the modified nano-clay is LAPONITE clay covalently modified with FOTES and cation-exchanged with Pc. In an independent embodiment, the modified nano-clay is LAPONITE clay covalently modified with APTMS and cation-exchanged with Pc. In another independent embodiment, the modified nano-clay is LAPONITE clay covalently modified with FOTES and APTMS, and cation-exchanged with Pc. In any of the foregoing embodiments, the modified nano-clay may have a grafting exchange of at least 20%. In certain embodiments, the grafting efficiency is greater than 100%.

III. COATING COMPOSITIONS

Embodiments of a coating composition comprise a modified nano-clay as disclosed herein and polyvinylidene fluoride (PVDF). The coating composition may further include a polyacrylic acid or a polyacrylate compound, e.g., poly(methyl methacrylate) (PMMA). Addition of polyacrylic acid or a polyacrylate improves dispersability of the hydrophobic PVDF in water. The coating composition may further include monomers known to interact with metals, thereby increasing adhesion of the coating to the metal. One exemplary monomer is ureido methacrylate. In some embodiments, the coating composition comprises PVDF and PMMA in a weight ratio from 50/50 to 70/30.

The PVDF, and optionally PMMA, may be present as nanoparticles of PVDF or PVDF/PMMA, the nanoparticles having an average particle size of 100-300 nm, such as an average particle size of 150-250 nm.

In some embodiments, the coating composition comprises at least 0.01 wt % and less than 1 wt % of the modified nano-clay based on a total mass of the nano-clay, the PVDF, and, if present, the PMMA. In certain embodiments, the coating composition comprises from 0.4 wt % to 0.6 wt % of the modified nano-clay. In some examples, the coating composition includes 0.6 wt % of LAPONITE clay modified with (i) FOTES and/or APTMS and (ii) phosphoryl-choline.

Alternatively, the concentration of modified nano-clay may be expressed in terms of its volume fraction within the coating composition. In some embodiments, the coating composition comprises at least 0.01 vol % and less than 0.4 vol % of the modified nano-clay based on a total volume of the modified nano-clay, the PVDF, and, if present, the PMMA. In certain embodiments, the coating composition comprises from 0.2 vol % to 0.3 vol % of the modified nano-clay.

In a dried coating composition comprising latex nanoparticles of PVDF or PVDF/PMMA, voids are present between the nanoparticles. Other voids and defects may exist or be produced over time from the loss or surface-migration of inorganic fillers (such as pigments). In some embodiments, at least a portion of the modified nano-clay is disposed within the voids. Voids filled, or partially filled, with modified nano-clay create a tortuous path that slows diffusion of water and ions through the coating composition to an underlying substrate.

Additionally, the covalently-bonded silanes have similar chemistry to the polymers, with APTMS being similar to the acrylic portion and FOTES being similar to the PVDF portion. The similar chemistry reduces surface energy differences between the polymer and clay particles, which may facilitate formation of an interpenetrating network of clay particles throughout the composition in addition to, or in place of, clay aggregation in the interstitial voids.

In some embodiments, the coating composition comprises (i) PVDF and PMMA in a weight ratio within a range of 50/50 to 70/30, and (ii) 0.4-0.6 wt % modified LAPONITE clay based on a total mass of the modified LAPONITE clay, PVDF, and PMMA. In one embodiment, the LAPONITE clay is modified with FOTES and Pc. In an independent embodiment, the LAPONITE clay is modified with APTMS and Pc. In another independent embodiment, the LAPONITE clay is modified with FOTES, APTMS, and Pc.

Embodiments of the disclosed coating compositions, when applied to a substrate, are optically transparent. The modified nano-clay in the composition may not be spectroscopically visible by scanning electron microscopy or transmission electron microscopy. However, the thin-film XRD may show a LAPONITE clay peak. Additionally, energy dispersive spectroscopy may detect presence of silicon in the coating composition.

Prior to application to a substrate, the coating composition may be an aqueous dispersion of (i) the modified nano-clay and (ii) PVDF or PVDF/PMMA. For example, the modified nano-clay may be combined with a commercially available PVDF or PVDF/acrylic coating composition, e.g., Kynar Aquatec® FMA-12 latex (50:50, PVDF and PMMA), Kynar Aquatec® ARC latex (70:30 PVDF and acrylic resin), Kynar Aquatec® CRX latex (70:30 PVDF and acrylic resin), or Kynar Aquatec® PVDF latex, all from Arkema, Inc., King of Prussia, Pa.

IV. PROTECTIVE COATINGS

Embodiments of the disclosed coating compositions are useful for coating objects including metal components, such as metal sculptures and architectural elements (e.g., railings, poles, gates, bridges, etc.). In some embodiments, the metal is bronze, brass, steel, or aluminum. The coating composition provides a protective coating that protects the object from corrosion or other damage from exposure to the elements (rain, air pollution, etc.) and other contact contamination (plant debris, animal waste, body oils, etc.).

In some embodiments, the coating composition is applied to at least a portion of the metal component. The coating composition may be applied to the entire metal component or object. The coating composition is applied by any suitable means, including but not limited to brush application, dipping, and spray coating. The coating composition is then allowed to dry. The coating composition may be dried at ambient conditions. In some embodiments, the coating composition is annealed, e.g., at 60° C. for several hours, such as for 4-8 hours.

Desirably, the protective coating formed with the coating composition is a continuous, or substantially continuous, coating. The protective coating may include one or more layers of a coating composition as disclosed herein, wherein the coating composition is in direct contact with the underlying metal. In some embodiments, the protective coating may further include a layer of a primer base coat and/or a layer of a top coat comprising PVDF. An exemplary primer coat is PMMA-coPEA (poly(methyl methacrylate)-poly (ethyl acrylate)), a solvent-based acrylic polymer coating for the protection of bronzes (e.g., Paraloid B-44, Rohm and Haas Company, Philadelphia, Pa.).

In some embodiments, the protective coating has an average thickness of 10-100 µm, such as an average thickness of 20-50 µm or 20-40 µm. If the protective coating includes multiple layers of the coating composition or layers of coating composition and base coat/top coat, each layer may have an average thickness of 5-20 µm, such as an average thickness of 10-15 µm.

Embodiments of the disclosed protective coatings have superior properties compared to protective coatings that do not include a modified nano-clay as disclosed herein. In some embodiments, the protective coating has reduced mass (ions, water) transport, reduced permeability, a higher impedance before and after weathering, a lesser reduction in impedance after weathering, a lower electrochemical stress index, increased resistance to water absorption, reduced whitening after exposure to water, less surface ablation after weathering, reduced UV degradation, lower diffusion coefficients and rates, and combinations thereof, as compared to a protective coating without a modified nano-clay as disclosed herein. Objects including a protective coating as disclosed herein also have increased resistance to corrosion.

Weathering effects may be assessed naturally by placing a coated object outdoors. Alternatively, weathering can be accelerated using an industry-standard accelerated weathering tester, such as a QUV® Accelerated Weathering Tester (Q-Lab Corporation, Westlake, Ohio), which simulates outdoor weather by exposure to alternating cycles of UV light and moisture at controlled, elevated temperatures. Exemplary methods for determining mass transport, permeability, impedance, electrochemical stress index, water absorption, whitening, surface ablation, UV degradation, and diffusion coefficients are provided in the Examples.

In some embodiments, the disclosed protective coatings have a water diffusion rate that averaged 4.5-1.5× slower than a PVDF film or PVDF film+unmodified LAPONITE clay (LNa). After soaking for 72 hours in water, embodiments of the disclosed protective coatings exhibited 50-65% less whitening compared to PVDF films, indicating that water uptake was much less.

The initial impedance of a fresh (unweathered) protective coating may be at least 3000 MΩ·cm$^2$ at 0.1 Hz, such as at least 3500 MΩ·cm$^2$ or at least 4000 MΩ·cm$^2$. In contrast, the impedance of a PVDF film was 500 MΩ·cm$^2$, and the impedance of a PVDF-LNa film was 2900 MΩ·cm$^2$. After weathering (e.g., for 4500 hours in a QUV® weathering tester), some embodiments of the disclosed protective coatings retain an impedance of at least 1000 MΩ·cm$^2$, such as at least 1500 MΩ·cm$^2$, at least 2000 MΩ·cm$^2$, or at least 2300 MΩ·cm$^2$. In contrast, a weathered PVDF film had an impedance of only 35 MΩ·cm$^2$, and a weathered PVDF-LNa film had an impedance of 417 MΩ·cm$^2$. Thus, a PVDF film had a 93% decrease in impedance after weathering, and a PVDF-LNa film had an 86% decrease. In contrast, embodiments of the disclosed protective coatings had an impedance decrease of less than 70%, such as an impedance decrease of less than 60% or less than 50% after 4500 hours of weathering.

Embodiments of the disclosed protective coatings also have a lower electrochemical stress index compared to PVDF films. ES values range from 0-3, with zero indicating low stress and three being the theoretical maximum. In one example, a PVDF film had an ES of 2.66 after 4500 hours weathering, and a PVDF-LNa film had an ES of 1.48. In contrast, embodiments of the disclosed protective coatings have ES values less than 1.4, such as less than 1.2 or even less than 1.0.

In a corrosion study, PVDF and PVDF-LNa films showed corrosion after 1500-3000 hours. In contrast, a protective coating including APTM-modified LAPONITE clay showed corrosion after 3500 hours, and a protective coating including FOTES-modified LAPONITE clay showed no corrosion after 4500 hours.

Loss of the ester functionality is the primary means of material loss and pathway of degradation for PMMA-co-PEA coatings. Studies show that PVDF films/PMMA films also lose acrylic side groups with weathering. Indeed, films without modified nano-clays were nearly devoid of acrylic character after 4000 hours. The smallest loss occurred with a film including FOTES-modified LAPONITE clay, indicating reduced photodegradation with embodiments of the disclosed protective coatings.

Coatings may undergo surface ablation with weathering as evidenced by loss of film thickness and/or surface enrichment of crystalline of PVDF. Embodiments of the disclosed protective coatings exhibited less surface ablation than PVDF or PVDF-LNa films. For example, the thickness of a PVDF film was reduced by 36% after 4000 hours in a QUV® accelerated weathering tester, and the gloss was reduced by 33%. Some embodiments of the disclosed protective coatings, particularly coatings including FOTES-modified LAPONITE clay, had a thickness reduction of less than 30%, such as less than 25%, and a gloss reduction of less than 20%, such as less than 15%.

V. EXAMPLES

Applied Coatings:

Preparation of bronze (2.54×7.62 cm; 90% Cu 10% Sn) and vinyl (3×8 cm; polyvinyl chloride-co-acetate) substrates are detailed elsewhere (Swartz et al., *Prog. Org. Coat.* 2012, 75(3):215-223). Basecoat primers were resin dissolved in solvent [Paraloid™ B-44 resin, principally composed of poly(methyl methacrylate-co-ethyl acrylate), in 20% (w%/w toluene), Dow, Inc.]. The topcoat used was water-borne Kynar Aquatec® FMA-12 latex [50:50, polyvinylidene fluoride and poly(methyl methacrylate) blend, Arkema, Inc.]. Substrates (bronze and vinyl) were spray-coated with a Fuji HVLP Super 4 XPC™ for a dry film thickness of approximately 10-15 µm for each layer (i.e. primer base coats or PVDF topcoat) for a total dry film thickness of approximately 30 µm. Coatings were annealed in an oven for six hours at 60° C. Accelerated weathering was performed according to ASTM G154 Cycle B: 4 hours UV-B exposure (60° C., $E_e$=0.71) and 4 hours condensation (50° C., recirculating distilled water). For whitening and mass uptake values, films on vinyl were soaked in distilled water and analyzed at 4 and 72 hours, with three trials of each coating type. Coating masses were taken as the average of three measurements (N=3, M=3), and for grayscale measurements the films were illuminated for imaging according to ASTM D1729-96. Images were recorded with a Nikon D40 and converted to grayscale in Adobe Photoshop CC, where the average k value (N=3, M=9) of the chart was obtained. Gloss and thickness measurements were acquired as an average of five trials with a Gardco μ-Tri-Gloss meter.

Preparation of Clays

LAPONITE clay RD and S482 (Southern Clay Products, Inc.) and siloxylating agents 3-acetoxypropyltrimethoxysilane (APTMS, Gelest, Inc.) and (tridecafluoro-1,1,2,2-tetrahydrooctyl) triethoxysilane (FOTES, Gelest, Inc.) were used as supplied. To obtain covalently modified clays, toluene was distilled directly into a flask containing LAPONITE clay RD (1 g nano-clay/100 mL solvent) under anhydrous conditions in a closed system ($\delta^+ N_2$ flow). After 30 minutes of heating with stirring at 35° C., the silane was added to the toluene clay mixture (1 mmol/g clay) and the contents in the flask were left to stir an additional four hours at the same temperature. The covalently modified LAPONITE clay was isolated for diffraction analysis by vacuum filtration with a 0.2 μm nylon membrane, washed extensively with toluene then dioxane and dried 12 h at 65° C. The aqueous dispersions of modified clay (LA: LAPONITE clay-APTMS or LF: LAPONITE clay-FOTES) were obtained by quenching the grafting reaction with 50 mL of water and isolating the water-stable nano-clay by liquid-liquid extraction in a separatory funnel. For cation exchange aqueous dispersions of LA and LF were diluted to 100 mL and heated to 50° C. after which one equivalent ($CEC_{LAPONITE\ clay}$=0.75 mmol/g clay) of phosphocholine chloride calcium salt tetrahydrate (Pc) was added and stirred for 12 hours. The exchanged/grafted clay (LAPc and LFPc) was vacuum filtered, washed with cold ethanol and immediately re-dispersed in deionized water. Aqueous dispersions (2.6% w/w) of clays of LAPc, LFPc or LAPONITE clay S482 (LNa: unmodified sodic LAPONITE clay blended with peptizing agent tetrasodium pyrophosphate) were added with high shear to freshly prepared PVDF latex immediately after preparation and no aging/gelation of the clay was observed at time of incorporation. The presence of chemical modifiers at each step was initially confirmed by ATR-FTIR.

Characterization

Electrical impedance spectroscopy (EIS) is a non-destructive technique for monitoring dielectric properties of materials and has been shown to produce similar or more sensitive results as Attenuated Total Internal Reflectance Fourier Transform Infrared Spectroscopy (ATR-FTIR) or gravimetric methods for detecting water-uptake into polymers. Time-course EIS spectra of films during weathering can be useful in providing insights to the electrochemical changes that occur before the point of coating failure. A working electrode area of 14.6 $cm^2$ was saturated with electrolyte (3% NaCl) for EIS analysis with a Gamry Reference 600 Potentiostat from 1 MHz-0.1 Hz with AC voltage 20 mV rms and DC voltage 0.0 V vs. open circuit potential (0±200 mV). Spectra were interpreted and modeled against equivalent electrical circuits (EECs) with Scribner Associates ZView. Errors in fit EEC models to the data were calculated as the sum of residual error where the fit differed from the experimental data. Average potentiostat instrument error ranged from 10% at 0.1 Hz to less than 0.5% at 1 MHz. Zeta-potentials were measured on filtered aqueous clay dispersions with a Malvern Zetasizer Nano and disposable plastic cells. Thermogravimetric measurements were acquired in platinum crucibles at a scanning rate of 20° C./min from 50-750° C. using a Perkin-Elmer TGA7. Capacitance values for diffusion analysis were calculated at 10 kHz according to $C_t = -1/(\omega \cdot Z_i)$, where $\omega$ is the radial frequency and Zi is the imaginary component of impedance. The rate of diffusion (D) through the coatings by the most mobile species (water) was determined by fitting the linear portion of the relative uptake profiles to the following equation:

$$\frac{\log\left(\frac{C_t}{C_0}\right)}{\log\left(\frac{C_s}{C_0}\right)} = \left(\frac{4D}{L^2 \pi}\right)^{1/2} t^{1/2}$$

where $C_0$ is the capacitance of the film before the electrolyte immersion found by extrapolation to t=0 s, $C_S$ is the saturated capacitance of the film, L is the thickness of the coating, and $t^{1/2}$ is the square root of the immersion time.

ATR-FTIR spectra were acquired with a Nicolet Continuμm FT-IR microscope with a ThermoScientific iS10 infrared spectrometer and a 50 μm MCT detector (4 $cm^{-1}$ resolution) operated with Omnic. Spectra were acquired using a diamond ATR objective to enable in-situ analysis of a roughly circular area with a 250 μm diameter. Data was transformed using an N—B strong apodization function and Mertz phase correction. Raman spectra were measured with a Horiba LabRam microscope using a 532 nm diode laser (22 mW), 50× objective (200 μm confocal hole), 1800 gr/mm grating and LabSpec 6 software. All X-ray studies were acquired with a Rigaku Ultima IV Multipurpose X-ray diffractometer with a Cu-kα radiation source ($\lambda$=1.542 Å) and step size=0.002 deg for 12 sec. Powder samples were ground finely with an agate mortar and pestle and pressed into a random orientation on a mirrored slide. For scattering studies in transmission mode, thin-walled glass capillary tubes (1.5 mm, Charles-Supper, Co.) were filled with either the aqueous clay dispersions or wet resin and attached to a 20-mm sample window fixed in place near the vacuum path window. Thin film spectra with or without a 0.5° grazing angle were acquired in-situ after alignment of the sample in the x-, y-, and z-directions. XPS measurements were performed on vacuum dried clays with a Phi VersaProbe II using an Al kα anode (10 μm spot size) and MultiPak software. Cross sections for maps were sliced with a scalpel, mounted on a carbon tape, and mapped in a 5×15 array with a 633 nm diode laser (16 mW).

Example 1

Surface Modification of Clays

Covalent modification of LAPONITE clay nano-clays with APTMS or FOTES silanes occurs via a reaction between the hydroxyl groups on the edge of the clay sheet and a silane bond to produce covalent siloxy bonds, as illustrated by the products shown in FIG. 1B. To promote the exfoliated state (aqueous isotropic), ionic exchange with phosphorylcholine tetrahydrate (Pc) was undertaken to create covalently-modified and cation-exchanged nano-clays, abbreviated LAPc and LFPc. Surface coverage, successful covalent attachment of the silanes and amount of physisorbed water on the clay particles were investigated by FTIR, XPS, WAXD, TGA, and Raman spectroscopy.

Fourier transform infrared spectra of Lap-APTMS with and without PC were collected. With LAPONITE clay present, a number of IR bands produced by the hydroxyl groups and sorbed water in the clay were observed. O—H stretching peaks appeared from 3600-3400 cm$^{-1}$ and an H—O—H deformation peak was visible near 1632 cm$^{-1}$. After grafting with APTMS, additional peaks were observed: aliphatic C—H stretching (3000-2800 cm$^{-1}$ region), carbonyl stretch at 1709 cm$^{-1}$, and C—H rocking at 1285 and 1259 cm$^{-1}$. No increase in the Si—O stretch (1012 cm$^{-1}$) was observed post-modification because the vast majority of the band's intensity was produced by LAPONITE clay itself and the silane functionalization contributed only slightly. The Lap-APTMS spectrum was subtracted from the Lap-APTMS+PC spectrum to observe small changes in the spectrum after cation exchange with PC. Apparent in the subtraction spectrum were asymmetric and symmetric stretching P—O$_3$ bands at 1151 and 1092 cm$^{-1}$, respectively, the C—O—P stretching band at 967 cm$^{-1}$ and an additional C—H bending peak (δ C—H) near 1478 cm$^{-1}$; all are spectral features of the negatively charged phosphate head group since the quaternary amine is not infrared active. Presence of the expected IR bands after each modification step in the production of Lap-FOTES and Lap-FOTES+PC were also verified by infrared analysis. Negative peaks from the subtraction of Lap-APTMS from the Lap-APTMS+PC spectrum occurred near the C=O and C—H bending regions of the spectrum, indicating a slight loss of the silane after cation exchange, likely due to loss of adsorbed silane.

The Raman spectral features of LAPc and LFPc compared to unmodified clay (LNa) each have distinctive characteristic vibrations confirming their presence: (1) a carbonyl stretching band at 1718 cm$^{-1}$(vC=O) for LAPc or (2) the trifluoromethyl mode at 749 cm$^{-1}$ (vC-F$_3$) for LFPc. Other characteristic frequencies include aliphatic vibrations from methylene asymmetric ($v_{as}$ C—H$_2$) and symmetric ($v_s$ C—H$_2$) stretching at 2945 and 2900 cm$^{-1}$, where the intensities of these bands were blue shifted for LFPc due to the dense electronegativity of the fluorinated tail ($v_{as}$ C—H$_2$=2955 and $v_s$ C—H$_2$=2920 cm$^{-1}$). In-chain methylene motions are responsible for a number of C—H deformation modes present from 1462-1221 cm$^{-1}$. Peaks indicative of the tetrahedral structure of the silicate include the unmodified clay LNa's characteristic peak at 683 cm$^{-1}$ (Si—O$_4$ stretch) and various metal-oxide vibrations found lower than 600 cm$^{-1}$ including peaks at 482 cm$^{-1}$ (Si—O) and 360 cm$^{-1}$ (Mg—O).

gallery space by ~0.3 nm, the tumbling radius of water, suggesting the presence of a layer of water trapped between platelets.

Modification of clays expanded the gallery space (observed by a shift of $d_{001}$ to lower angles) to 1.74 nm for LAPc and 1.51 nm for LFPc, as listed in Table 1 with their net change. Given that the lateral cross-section of the siloxane is close to 0.5 nm, the basal expansion is likely related to the lateral height of excess silane intercalated between platelets in a monolayer fashion where both ends are touching the clay surface. Furthermore, an interdigitated bilayer arrangement of Pc in the gallery space would have an expansion greater than the length of the cationic chain, 0.61 nm, as shown by LAPc. Typically this expansion bears little influence on the particle's behavior in a solvent. When initially dispersed in water, organo-clays LA and LF did not exfoliate fully until blended with the same peptizing agent as LNa (tetrasodium pyrophosphate, TSPP).

Thermal gravimetric analysis of covalently modified clays LA and LF was compared to unmodified clay LNa. Thermograms by mass loss and their first derivative plots where three main phases of degradation upon heating of LNa were observed. These phases indicate: (1) loss of adsorbed water on the particle surface from 50-330° C. and equal to 12.1% mass, (2) loss of interlayer from 330-600° C. where approximately 2.5% mass loss occurred and (3) the onset of hydroxyl degradation at 600° C. Modified clays exhibited four main phases, the first of which from 50-170° C. was also due to bulk water loss and indicated 6.5% and 7% water content in the clay structure for LA and LF, respectively. This was less water than released by unmodified clay LNa, as compared in Table 1. A decrease in hydrophilicity after modification should correspond to a decrease in surface charge and was confirmed by zeta potential measurements (see Table 3 below). The calculated number of surface-bound water molecules per LAPONITE clay unit cell (MpU=# molecules/# clay unit cell) was 7.1 MpU for LNa, 5.1 MpU for LA, and 4.5 MpU for LF. The second decomposition phase in LA and LF from 150-320° C. indicated a significant amount of silane was adsorbed to the surface of the clay due the lower temperature of degradation than the covalently bound molecules observed in the third region from 320-600° C. Using the mass lost in each phase,

TABLE 1

Physical properties of clays described by Raman, WAXD, and TGA

| | Free H$_2$O 3450 cm$^{-1}$ | Si—O$_4$ 683 cm$^{-1}$ | $\frac{I\ 3450\ cm^{-1}}{I\ 683\ cm^{-1}}$ | 2θ (°) | $d_{001}$ (nm) | Δ $d_{001}$ (nm) | Adsorbed H$_2$O (% w/w) |
|---|---|---|---|---|---|---|---|
| LNa | 528.5 | 1416.9 | 0.373 | 6.97 | 1.27 | 0.35 | 12.1 |
| LAPc | 819.2 | 2805.5 | 0.292 | 5.1 | 1.74 | 0.82 | 6.45 |
| LFPc | 578.2 | 3027.2 | 0.191 | 5.84 | 1.51 | 0.59 | 7.00 |

Raman spectra were normalized to value of Si—O$_4$ band at 683 cm$^{-1}$. The increase observed in $d_{001}$ spacing was calculated relative to the dry unit cell (0.92 nm)

The wide-angle diffraction (WAXD) patterns of dry LAPONITE clay before and after modification showed an increase in the interlayer gallery or basal spacing (door) of the clay upon functionalization. Sodium LAPONITE clay is an amorphous nano-clay and, without modification, exists as an average of 3 stacked platelets in its bulk form with no long-range order. As such, the WAXD spectra show broad peaks at most angles that subsequently mask some of the characteristic 00€ patterns, such as $d_{002}$ and $d_{004}$. The broad $d_{001}$ of the LNa peak at 6.97 2θ indicate: (1) random disordered stacking of the clay and (2) expansion of the relative percentage of molecules adsorbed as opposed to covalently bound were 23% for LA and 35% for LF.

From thickness and unit cell values obtained during WAXD analysis, it was estimated that there are 1,050 unit cells per LAPONITE clay platelet. This number compared well to other works that used surface adsorption and titrations to derive an accessible hydroxyl density of 0.36 mmol —OH/g clay (Herrera et al., *J. Mater. Chem.* 2005, 15:863-871). Given dry conditions of the synthesis, platelets were likely suspended in small stacks of 3 discs in anhydrous toluene with broken edge hydroxyls available for grafting.

Utilizing the measured coordinates by XRD in combination with the empirical formula of the unit cell, each 3-disc stack would have approximately 730 silanols available for attachment along the disc edges, and thermal gravimetry data provided a value of 907 accessible hydroxyl groups.

Small-angle X-ray scattering (SAXS) is a useful technique for modeling the shape and size of nanoparticles in various media. Using the values obtained in WAXD as initial estimates, improved fitting of the scattering form factor used a single dispersion of cylinder shaped particles with an aspect ratio of 0.05 to provide the values listed in Table 2. The model-fit diameter of LNa was found to be 22.6 nm with a corresponding layer thickness of 1.13 nm, nearest neighbor at 15.9 nm and a narrow polydispersity (RSD=14.3%). The decreased layer thickness and large nearest neighbor value suggested the clay particles were completely exfoliated in water, while a small RSD showed uniform particle size dispersion.

TABLE 2

Physical properties of clays in water - SAXS

| | SAXS $d_{H2O}$ (nm) | SAXS $t_{H2O}$ (nm) | neighbor (nm) | RSD (%) | % Error |
|---|---|---|---|---|---|
| LNa | 22.6 | 1.13 | 15.9 | 14.3 | 0.16 |
| LAPc | 33.6 | 1.68 | 1.68 | 47.0 | 0.28 |
| LFPc | 30.1 | 1.51 | 1.81 | 25.7 | 0.50 |

Analysis was performed for aqueous clay suspensions with a cylinder geometry (aspect ratio = 0.05)

Further inspection of undiluted aqueous dispersion of covalently modified clays by SAXS indicated good correlation to WAXD values with some degree of particle aggregation at the deliverable concentration (2.5% w/w). Dispersions were termed 'exfoliated' or 'flocculated' as dependent on the similarity of the SAXS models to unmodified LNa, which has been well documented to form a stable exfoliated clay-water system at low concentrations (Kimura et al., Rheol. Acta 2011, 50:159-168). The average diameter obtained from a cylinder model fit to the scattering profile of aqueous LAPc was equal to 34.8 nm ($t_{H2O}$=1.74 nm) and 30.2 nm for LFPc ($t_{H2O}$=1.51 nm). All aqueous dispersions of modified clays showed a closer nearest neighbor than unmodified LNa, where the furthest particle distance belonged to LFPc (1.81 nm) and the most particle interaction by LAPc (1.67 nm). For LAPc the nearest neighbor values showed the closest platelet was within the distance traveled perpendicularly through one hydrated particle, indicative of short range ordering in solution. For LNa and LFPc, with the nearest neighbor values being larger than the layer thickness of aqueous clay, that result suggests that the swollen, hydrated platelets were mostly exfoliated. Increased particle-particle interactions were observed for LFPc by the small peak at 0.3 Å.

Figure 2:
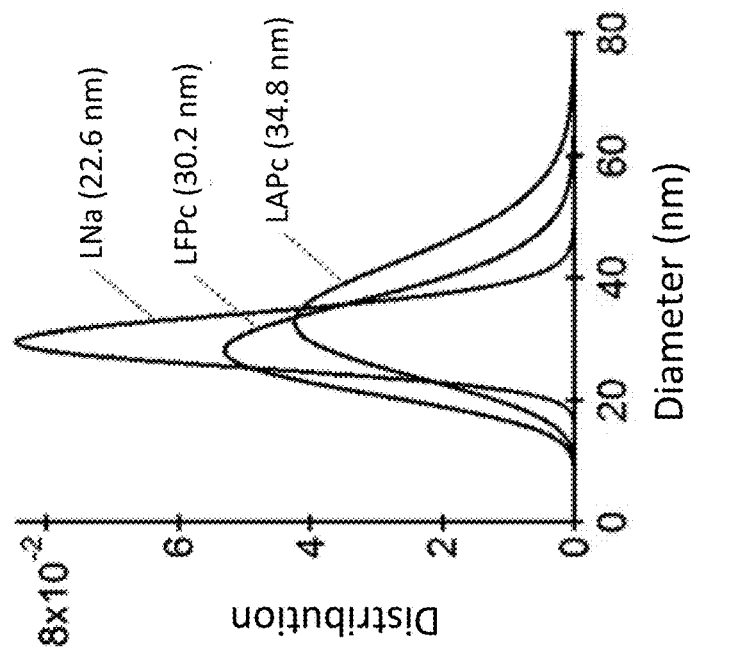
FIG. 2 is a graph showing a modeled size distribution for LAPONITE clay (LNa), LAPONITE clay modified with APTMS and Pc (LAPc), and LAPONITE clay modified with FOTES and Pc (LFPc).

The modeled distributions also provided evidence for some larger aggregates but the majority of particles were near the median values, as shown in FIG. 2. If using the RSD % (relative size distribution) as a marker of polydispersity, cationic exchange with phosphoryl choline increased polydispersity of LFPc to 25.7%. However, this value was still lower than LAPc (RSD=47.0%) and weighted to larger, not smaller, diameters of 50-90 nm. The steric bulk of the fluorinated silane may act to repel particles after anisotropic (charge disparity) behavior is restored by cationic exchange. The smaller APTMS chains could allow for tethering through hydrogen bonding (dimerization of end groups) and possible edge-face aggregation if surface coverage was not uniform.

Figure 3:
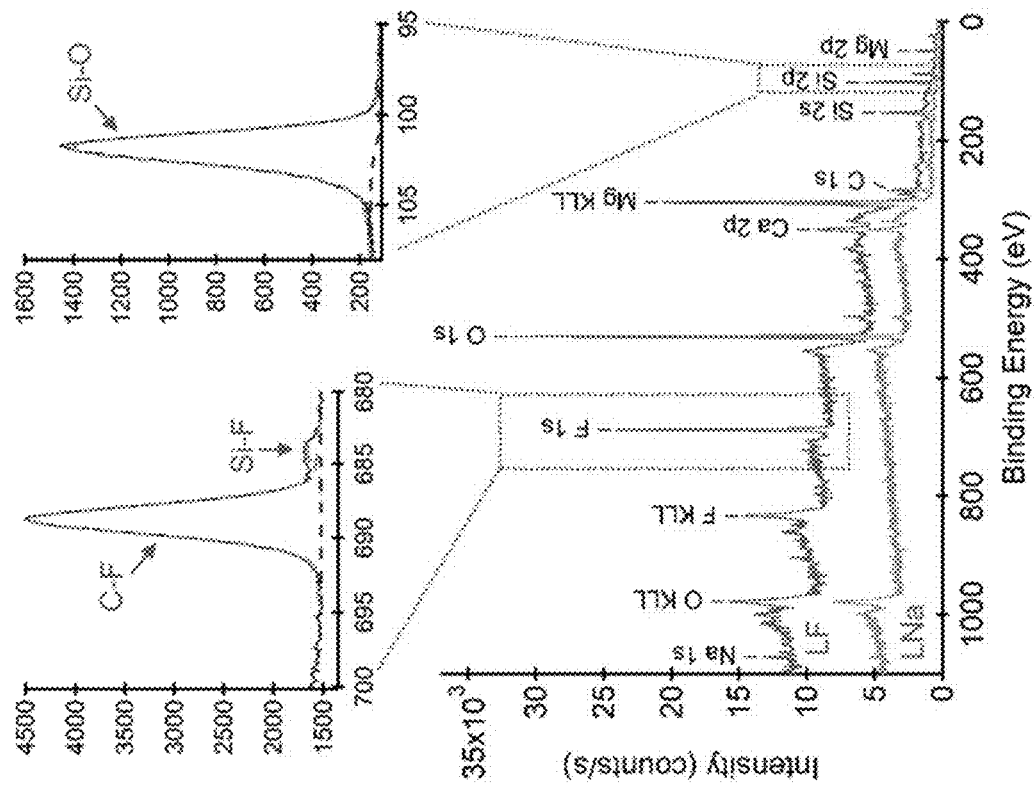
FIG. 3 shows an XPS (X-ray photoelectron spectroscopy) scan of FOTES-modified LAPONITE clay (LF) with expansions of the fluorine 1s and silicon 2p regions used in quantitation. Peaks used in peak fitting of the data are shown with dashed lines overlapping the spectrum. Unmodified clay (LNa) is shown for comparison. The KLL lines are Auger emissions.

Integration of regions Na 1s, Si 2p, Mg 2s, Li 1s, and O 1s peaks in the XPS scan of LNa confirmed the empirical formula of the clay's unit cell (FIG. 3). High resolution scans of clay LF showed peaks at 688, 683 and 102 eV that correspond to the binding energy of F 1s and Si 2p orbitals, and were fit with a Lorentzian peak shape for quantitation. The two peaks in the F 1s scan are due to organic C—F bonds in the silane molecule and the metallic Si—F bonds from a small amount of direct fluorination of the silicate, which is likely a byproduct of the sample and X-ray beam interaction. The peak ratio of fluorine from the peak at 688 eV to silicon at 102 eV indicated that on average each 25 nm discoid had 690 FOTES molecules on its surface. Calculations of the data from WAXD measurements determined that each unmodified clay LNa disc had approximately $1.05 \times 10^3$ unit cells and 290 accessible docking sites along the rim, which provided a grafting efficiency of 228% for LF. TGA analysis of LF showed a gravimetric decrease upon heating and quantitatively revealed that 35% of the FOTES molecules were physisorbed to the clay surface. When the number of FOTES molecules per clay stack was adjusted by −35%, the result was 148% covalent grafting efficiency of the docking sites or on average 1.5 FOTES molecules/accessible hydroxyl. The grafting efficiency of 1.5 suggests that cross-linking reactions between silane molecules occurred, resulting in an average of 1-2 molecules bound per site.

Figure 4:
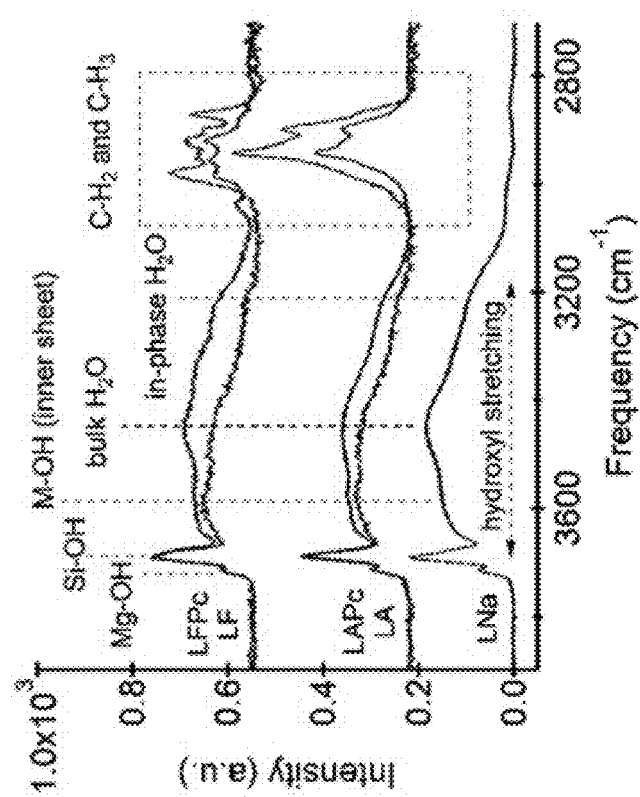
FIG. 4 shows Raman spectra of the hydroxyl and aliphatic regions of LNa, LAPc, and LFPc; the spectra are normalized to the Si—$O_4$ band at 683 $cm^{-1}$.

Having hydrophilic nano-clays is important to prevent flocculation or gelation of the clays upon addition to the aqueous coating dispersion. Since active Raman modes are very sensitive to their environment, characteristic peaks of the layered silicates are shown in FIG. 4 and include a number of O—H stretches from metal-hydroxyl complexes as well as water adsorbed in various conformations: 3710-15 cm$^{-1}$ (Mg/Li—OH), 3688 cm$^{-1}$ (Si—OH), 3620 cm$^{-1}$ (inner sheet M-OH), 3450 cm$^{-1}$ (amorphous H—OH, bulk water), and 3200 cm$^{-1}$ (in phase H—OH with crystalline structure). As a measure of hydrophilicity, it is possible to compare the amount of physisorbed water on the different modified nano-clays using the intensity ratio of the Raman shift of bulk water (at 3450 cm$^{-1}$) to the silicon-oxide lattice of the nano-clay (Si—O$_4$ at 683 cm$^{-1}$). The hydroxyl stretching bands shown in FIG. 4 and ratios listed in Table 1 indicate that the largest hydrophilicity ratio was observed for unmodified clay ($I_{H2O/Si—O4}$=0.37). The amount of bulk water in the nano-clay decreased significantly upon modification with the organosilane and subsequently increased after cation exchange (LA=0.18 to LAPc=0.29 and LF=0.12 to LFPc=0.19). TGA showed that unmodified clay LNa had twice as much total water adsorbed by mass than LA or LF. The higher water content in the Pc exchanged clays was consistent with having successfully transitioned the covalently-modified nano-clays from organophilic to hydrophilic post-cation exchange. Both the polar tail of Pc as well as the occasional exchange of monovalent sodium for a divalent calcium counter-ion, which increases the hydration sphere for atmospheric water, likely contribute to the increased water sorption observed for the Pc compared to the non-Pc clays.

Clays are considered to be stable (i.e. unlikely to flocculate) in dilute dispersions that have zeta potentials, ζ, more negative than −30 mV (Cousin et al., Langmuir 2008, 24(20):11422-11430). Table 3 lists the measured electrokinetic potentials of each clay after undergoing covalent modification and cation exchange. Unmodified LNa had a $\zeta=-42.9$ mV when dispersed in water at neutral pH. The grafted/exchanged clays had slightly increased potentials of approximately −38 mV for both LAPc and LFPc. Cation-exchanged clays (LAPc and LFPc) were stable in water, whereas those that had not been exchanged (LA and LF) were not stable in water. The data demonstrated that such modifications to clays resulted in aqueous stable dispersions.

TABLE 3

Particle size and stability in aqueous and colloidal suspensions

| | $\zeta$ (mV) | $t_{H2O}$ (nm) | $t_{PVDF}$ (nm) | $d_{PVDF}$ (nm) | Neighbor$_{PVDF}$ (nm) | Volume$_{PVDF}$ (%) | Size Dist$_{PVDF}$ (%) |
|---|---|---|---|---|---|---|---|
| LNa | −42.9 | 1.13 | C 1.19 | 24.3 | 1.94 | 0.16 | 5.00 |
| | | | P 235.9 | 202.2 | 11.0 | 99.6 | 16.4 |
| LAPc | −37.8 | 1.68 | C 1.72 | 29.2 | 1.63 | 0.34 | 14.1 |
| | | | P 212.8 | 199.2 | 14.1 | 99.7 | 12.9 |
| LFPc | −38.3 | 1.51 | C 1.44 | 29.4 | 1.30 | 0.31 | 3.20 |
| | | | P 221.2 | 188.9 | 11.4 | 99.7 | 9.70 |

$\zeta$ = Zeta potential,
T = thickness,
D = diameter,
C = clay,
P = polymer.
H$_2$O values were calculated by SAXS using a cylinder model, and PVDF values were calculated by SAXS with spheroid model.

Figure 5:
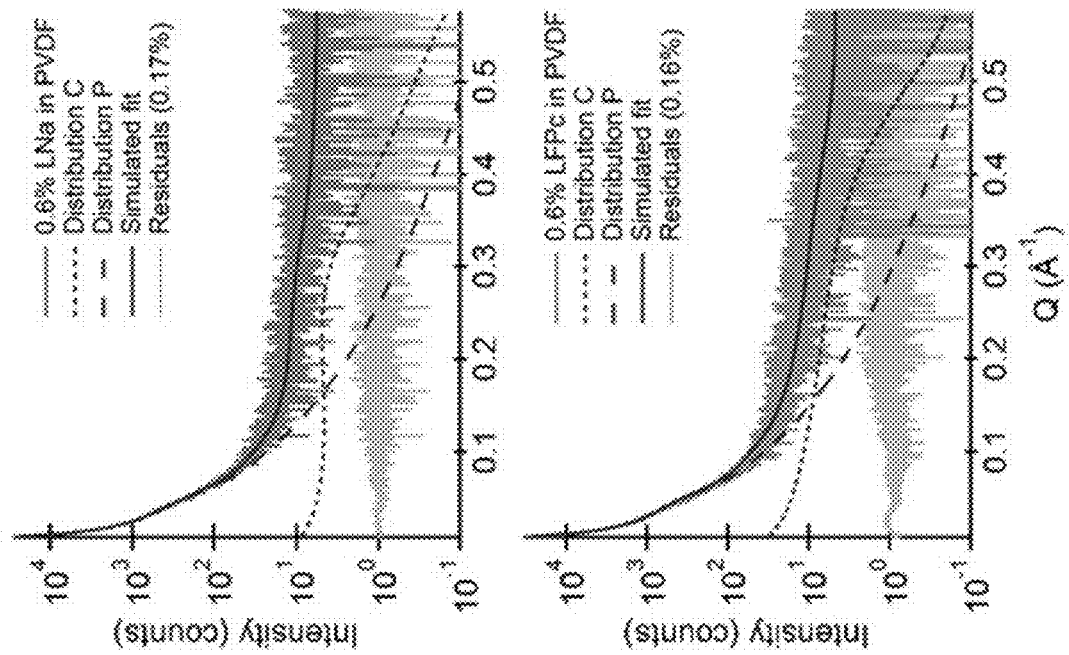
FIG. 5 shows SAXS models of modified nano-clays (C) in PVDF latex dispersion (P). Data shown is for LNa (top panel) and LFPc (bottom panel).

SAXS studies were undertaken to ensure adequate exfoliation in both aqueous solutions and in the polymer latex suspension. Based on particle sizes measured, these data showed that small, exfoliated clay platelets were produced, the relevant values from which are included in Table 3 for comparison. A two-dispersion spheroid model was fit to the data to determine particle sizes of latex and clay particles in water as shown in FIG. 5. The spheroid shape permitted flexibility in dimensions for multiple populations in the dispersion (i.e. the nano-clays with an aspect ratio ≈0.05 and the latex polymer with an aspect ratio ≈1). Fit diameters of the dispersed nano-clays (both in water and aqueous PVDF latex) are shown in Table 3. The diameter of the clay when mixed with polymer ($d_{PVDF}$) is quite similar to the diameter of the clay $d_{H2O}$ in water, indicating that the clay does not aggregate upon addition to the latex suspension. The closeness in scattering values and narrow polydispersity of clay populations obtained validates the use of the two-dispersion spheroid model for these mixed suspensions.

Using the intensity scale of each population in the dispersion, the volume fraction of scattering clay particles was, on average, 0.26%, which is in excellent agreement with the theoretical volume fraction of 0.28%, that was calculated using the density of LAPONITE clay (2.53 g/cm$^3$), density of PVDF resin (1.19 g/cm$^3$) and the 0.6% loading mass of clay. The small size and broad shape of the diffraction peak at 0.3-0.4 A$^{-1}$ suggested that the dispersion was highly disordered (poorly crystalline), which would be expected from randomly dispersed particles. The close particle-neighbor interactions and the flat profile of the clay scattering patterns suggest that any ordering is nematic (Fonseca et al., *Physical Review E* 2009, 79(2):021402), and any stacking that occurs is on a short scale in both distance and time.

Example 2

Barrier Properties of Waterborne PVDF-Clay Nanocomposites

Figure 6:
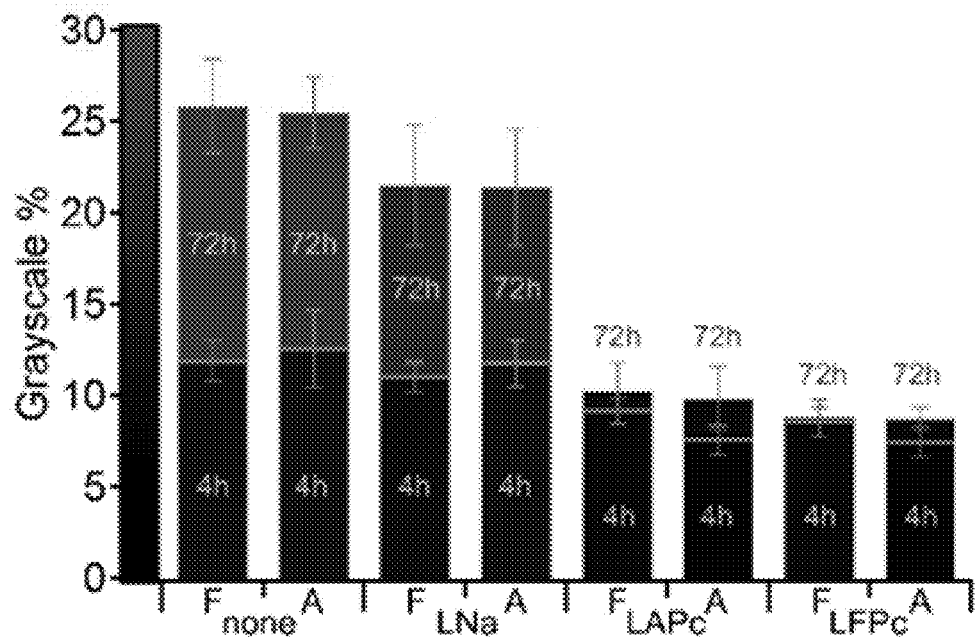
FIG. 6 is a bar graph showing whitening of the fresh (F) or annealed (A) films on black reference substrates after soaking in electrolyte for four and 72 hours. The initial grayscale values of all films was approximately 8%.

The grayscale values of fresh and annealed polymer nanocomposite (PNC) films measured after water-soaking for 4 and 72 hours are shown in FIG. 6, where black=0% and the film was completely transparent, whereas white=100% and the film was completely opaque. (Coatings are often annealed to aid in driving off volatile hydrophilic additives, which happens naturally with weathering, though over a longer time period.) While the grayscale values were similar across films after soaking for four hours, sustained soaking to 72 hours showed water whitening was reduced by 50-65% when chemically modified nano-clays were added compared to PVDF/PMMA (50% PVDF/50% PMMA-co-PEA) films without the clays. These data suggest that the numbers and/or volumes of light scattering voids present in the final films were reduced by adding nano-clays LAPc and LFPc into the wet suspensions, but not LNa.

Figure 7:
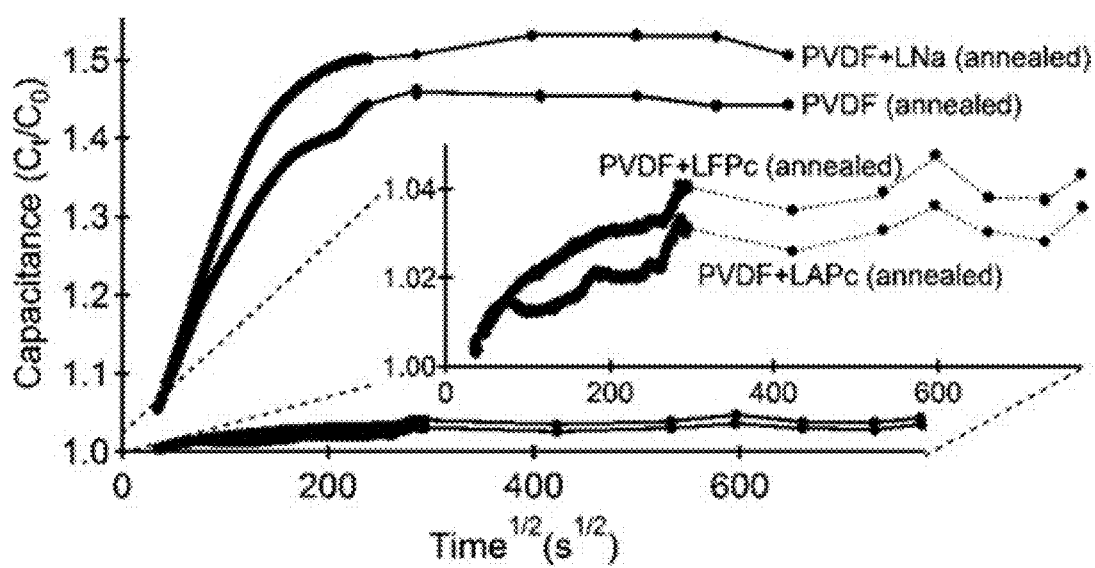
FIG. 7 shows diffusion profiles of electrolyte using relative capacitance of the films over time, with the inset provided for visual clarity (at an expanded scale) for two of the films

Permeability tests of the fresh (dry, but not weathered) films were conducted by allowing each coated substrate to soak in electrolyte until saturation. The capacitance was monitored as an impedance measurement at 10 kHz, using the imaginary part of the impedance as the capacitance. Relative capacitance (C/C$_0$) of annealed films versus √t was plotted in FIG. 7. The traces showed that diffusion through the films occurred in two stages: initial linear uptake and then a slow percolation until the films became saturated. The initial uptake profiles (35-200 s$^{1/2}$) in FIG. 7 of annealed PVDF and PVDF+LNa are considered to be type II Fickian diffusion, meaning that the pores are large enough that they do not restrict movement of ions. In contrast, the decreased slopes of the films with LFPc and LAPc are indicative of a material having a more constrained diffusion profile than for the other two films. The diffusivity of each coating to water can be quantified by the time it takes to saturate a film and the magnitude of the films' capacitance. The diffusion coefficients of water ($D_{H2O}$) through the fresh and annealed films are listed in Table 4. The fresh PVDF coating without nano-clays has the freest ion transport, 2.4×10$^{-9}$ cm$^2$/s, and developed visible pores on the coating surface upon extended soaking times. Fresh coatings with covalently modified nano-clays, LAPc and LFPc, had diffusion rates that were approximately six times slower than for the fresh LNa and PVDF only films and took a significantly longer time to reach saturation. In annealed films, the incorporation of LFPc into the PVDF coating halved its diffusion coefficient. The relatively free diffusion observed in the LNa composite film compared to the film without clay suggests that the high surface energy of the clay resulted in aggregation in voids at the surface that are large enough to scatter light, decreasing the film whitening (as the voids would be filled with the clay) and increasing the mass uptake (as the unmodified clays are highly charged). For comparison, diffusion through the best performing film (LFPc) was larger than that of the industry-standard solvent-borne acrylic coating by only a factor of 1.8. The uptake profiles of LAPc and LFPc in FIG. 7 show constrained and nearly single-file diffusion. Calculations have demonstrated that ion movement is restricted when pores are narrowed to less than twice the diameter of the diffusing species. For water, having a diameter of ~0.3 nm, the size when movement becomes restricted is 0.6 nm. Therefore, the data suggest that any pores that exist in the LAPc and LFPc films are 0.6 nm or smaller.

TABLE 4

Barrier properties of the films before and after 4500 hours QUV-B

|  | $D_{H2O}$ (cm$^2$/s) fresh | $D_{H2O}$ (cm$^2$/s) annealed | $|Z|_{0.1\ Hz}$ (MΩ · cm$^2$) Initial | $|Z|_{0.1\ Hz}$ (MΩ · cm$^2$) QUV 4.5k h | Electrochemical Stress Index |
|---|---|---|---|---|---|
| PVDF | 2.4 × 10$^{-9}$ | 4.8 × 10$^{-10}$ | 536 | 34.8 | 2.66 |
| PVDF + LNa | 5.0 × 10$^{-9}$ | 5.3 × 10$^{-10}$ | 2,910 | 417 | 1.48 |
| PVDF + LAPc | 8.6 × 10$^{-10}$ | 3.7 × 10$^{-10}$ | 3,490 | 1,530 | 0.993 |
| PVDF + LFPc | 7.6 × 10$^{-10}$ | 2.6 × 10$^{-10}$ | 4,210 | 2,390 | 0.987 |

For comparison, diffusion constants ($D_{H2O}$) for annealed coatings:
Wax = 1.31 × 10$^{-9}$ cm$^2$/s,
SB Acrylic = 1.46 × 10$^{-10}$ cm$^2$/s,
WB PVDF 70:30 = 3.95 × 10$^{-10}$ cm$^2$/s Given that these latex particles had an average particle size of 197 nm, as determined by SAXS and assuming spherical close-packed models, the maximum calculated diameter of the interstitial spaces from octahedral voids is 82 nm and from tetrahedral voids it is 44 nm. Those interstitial void dimensions are smaller than the wavelength of visible light and thus not likely to cause scattering/whitening, rather packing defects that result in larger pores must be present to observe whitening. However, given the relatively free diffusion observed in the LNa composite film compared to the film without clay, it seems likely that the high surface energy of the clay resulted in aggregation in voids and at the surface, decreasing the film whitening (as voids would be clay-filled) and larger mass uptake (as the unmodified clays are highly charged).

Figure 8:
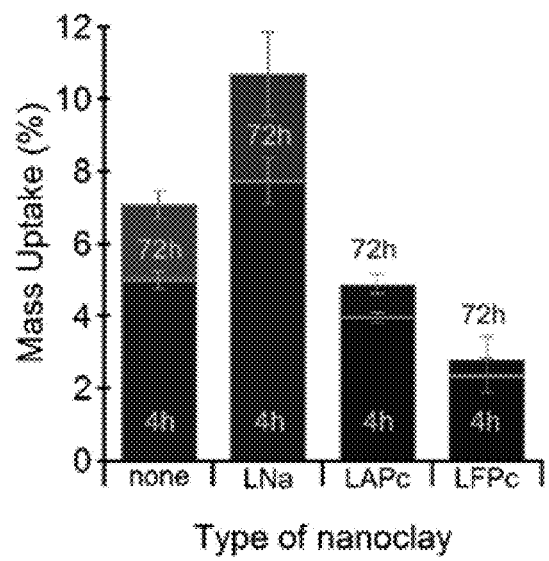
FIG. 8 is a bar graph showing the mass uptake percentage for various annealed coatings after soaking in water for 4 h and 72 h is shown. The shade of each bar represents the grayscale value shown in FIG. 6.

Having gained an understanding of the presence of light scattering voids and permeability profiles of the composite films, the entire water content within soaked films was measured by mass uptake studies. The data shown in FIG. 8 reveals that there was a much larger mass increase for the annealed films of PVDF and PVDF+LNa than for those with modified nano-clays after soaking for both 4 and 72 hours. Aside from having higher surface energy and clay-filled voids, that the LNa films absorbed significantly more water than the other nano-composite films may be due to a non-reversible expansion of the mineral structure of LNa upon heating (annealing) or soaking, which is a response that is typically reduced post-cation-exchange (i.e. as in LAPc and LFPc). It is also possible that unmodified nano-clays are more easily washed out during soaking, resulting in production of voids formerly occupied by the clays, which may have occurred for the LNa clays more than for the modified clays. It is likely that films containing modified nano-clays showed improved barrier properties for two reasons. First, the nano-clay itself provided a tortuous pathway for water. Second, the covalently-linked molecules have similar chemistry as the polymer (with APTMS being similar to the acrylic portion and FOTES being similar to the PVDF portion), reducing the surface energy difference between polymer and clay and encouraging the formation of an interpenetrating network in the composite, rather than clay aggregation in the interstitial voids. From the very small increase in whiteness value seen after 72 h compared to 4 h soaking times of the modified composite films, the data also suggest that annealing post-application is not necessary for those films. While the data in FIG. 6-8 showed significantly improved performance characteristics in modified composite films, those data showed little differentiation between the effectiveness of the acrylic versus the fluoroalkyl modified clays in corrosion prevention. Furthermore, the long-term performance profiles of the composite films were unknown.

A study using accelerated UV weathering of the films with characterization by EIS was undertaken to gain greater insight into the transport of electrolytes through the films over time. The aggressive weathering conditions were useful in determining if either chemical-modification scheme provided a significant long-term film performance improvement. All EIS spectra acquired of initial films before and during weathering were fit to a circuit model with two CPE/Resistor pairs in parallel: $CPE_{coat}(R_{pore})CPE_{dl}(R_{ct})$ until failure expanded the circuit model with another pair. The equivalent for a failed coating is $CPE_{perc}(R_{perc})CPF_{coat}(R_{pore})CPE_{dl}(R_{ct})$ and was only observed for PVDF without clay and with LNa after 3500 hours of QUV weathering. Additionally all EIS spectra were normalized with the cell constant (k=14.62 cm$^2$) so that all values presented with units in Farads (F) are F/cm$^2$ and Ohms (Ω) are Ω·cm$^2$.

The capacitance of the protective film can be thought of as a material's ability to store charge across a select area. A capacitor in parallel with a resistor representing the coating generally corresponds to the coating capacitance, $C_{coat}$, of the entire film and the pore resistance, $R_{pore}$, or the average open path through the coating to the substrate. Thus the product of the two elements is the time constant, $T_{coat}=R_{pore}C_{coat}$ and represents the shortest (minimum) relaxation time for an ion to travel from the bulk solution through the coating to the metal interface. The high frequency CPE(R) pair dominates the EIS spectra of these films from approximately 1-10$^6$ Hz and therefore $C_{coat}$, $R_{pore}$, and $T_{coat}$ can be assumed to represent the bulk of the protective coating. Based on the general formula for a planar capacitor (Equation 1), capacitance can increase due to: (1) change in permittivity from increased porosity, (2) change in permittivity from uptake of higher c liquid into the material matrix, (3) increase in surface area of the plate, and (4) decrease in film thickness—distance between plates.

$$C = \frac{\varepsilon_0 \varepsilon_m A}{d} \qquad (1)$$

Although the data was fit with models containing constant phase elements in place of capacitors, all values were converted to effective capacitance in Farad using the Brugg equation (Eq. 2):

$$C = \frac{(CPE \times R)^{\frac{1}{a}}}{R} \quad (2)$$

Total impedance at low frequencies ($|Z|_{0.1\ Hz}$) is usually dominated by the coating resistance ($R_{coat}$) or charge transfer ($R_{ct}$) resistance when the $|Z|$ is large. Regardless of circuit element attribution, decreases in the value of the impedance at 0.1 Hz are correlated with decreases in the film's barrier properties, where the minimum acceptable value of protective films is 10 MΩ (or in the cell setup used herein, 146 MΩ·cm²). Impedance values for these films are listed in Table 4 and plotted over 4500 hours of weathering in FIG. 9A. Low-frequency impedance increased for all films upon QUV weathering, likely due to annealing and other film morphological/chemical changes, before it decreased from its maximum value after 1500 h of exposure. By this metric, the LFPc film was the best performing coating as it retained a high initial impedance of 4,210 MΩ·cm² at 0.1 Hz during weathering with a final value of 2,390 MΩ·cm² after weathering (−43%). The film with the worst barrier properties, PVDF (without nano-clays) had an initial impedance of 536 MΩ·cm² and showed the most drastic decrease to 34.8 MΩ·cm² (−93%), below the minimum acceptable value and making it no longer considered to be protective. The film with LNa added had an initial impedance of 2,910 MΩ·cm², which showed improvement over PVDF without nano-clay and retained overall barrier properties during weathering, and a final impedance of 417 MΩ·cm², a decrease of −86% that approached the minimum protective impedance value for coatings. The coating with LAPc showed similar performance to LFPc films by having a high initial impedance of 3,490 MΩ·cm² and a relatively small (−53%) decrease in barrier properties yielding a final impedance of 1,530 MΩ·cm². As predicted by the small mass transport values, this EIS data shows that coatings with chemically modified nano-clays retained their protective qualities the most during weathering.

It is also useful to consider changes in key EEC elements compared to their initial values over time. From model-fit values of pore resistance and coating capacitance in FIGS. 9B, 9C, a similar trend to impedance values can be seen. An evolution of $C_{coat}$ can be observed in FIG. 9C, where each coating experienced a decrease in capacitance after the first weathering cycle. Capacitance of films with modified clay materials were higher after exchange with phosphoryl choline, as expected from the hydrophilic nature of the cation and increased water sorption seen in the Raman data. After 1000 hours of weathering, all films containing clay began to increase in capacitance. The highest final $C_{coat}$ after 4500 h of QUV-B was observed for the PVDF film without clay, 1.78 nF, followed by 0.794 nF for LAPc, 0.684 pF for LNa, and the lowest was 0.427 pF for LFPc. Recalling the ways in which a capacitor can increase in value, the most likely contributions after weathering include decreasing film thickness and increased permittivity, as the area is relatively unchanged and the films were analyzed after a UV exposure cycle where little water remained in the film. Changes in film thickness were measured with a tri-gloss meter, and the largest decrease was observed for the coatings with the highest capacitance: PVDF lost 37% of its total film thickness and LAPc lost 43%. In contrast, the coating with LFPc had the lowest capacitance and underwent the smallest change in film thickness of −23% and similarly LNa lost 29.4%. Evidence of surface ablation with loss of acrylic functionality in the film was also observed by ATR-FTIR and TF-XRD as discussed below.

Figure 9A:
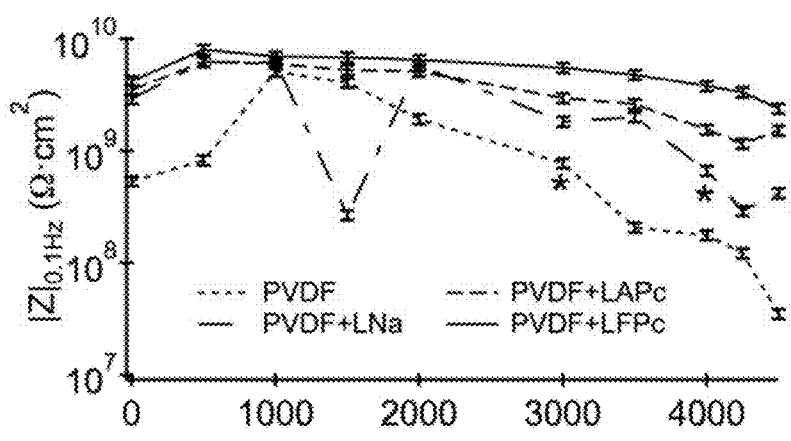
FIGS. 9A-9D show an impedance analysis of films with and without nano-clays. Plots of total impedance at low frequency 0.1 Hz as measured over 4500 hours of QUV® weathering with UV-B radiation (FIG. 9A), where the asterisk (*) marks the transition to a more complex EEC, when percolation through the top layer of the coating became measurable. Coating resistance (FIG. 9B) and capacitance (FIG. 9C) are plotted using the 'Before Weathering' model until 3000 h for PVDF and 4000 h for PVDF+LNa; thereafter the 'Failure after Weathering' model was used. Dotted vertical lines in (FIG. 9B) mark the time point when corrosion on the substrate became visible as small circular brownish dots on the samples.
Figure 9B:
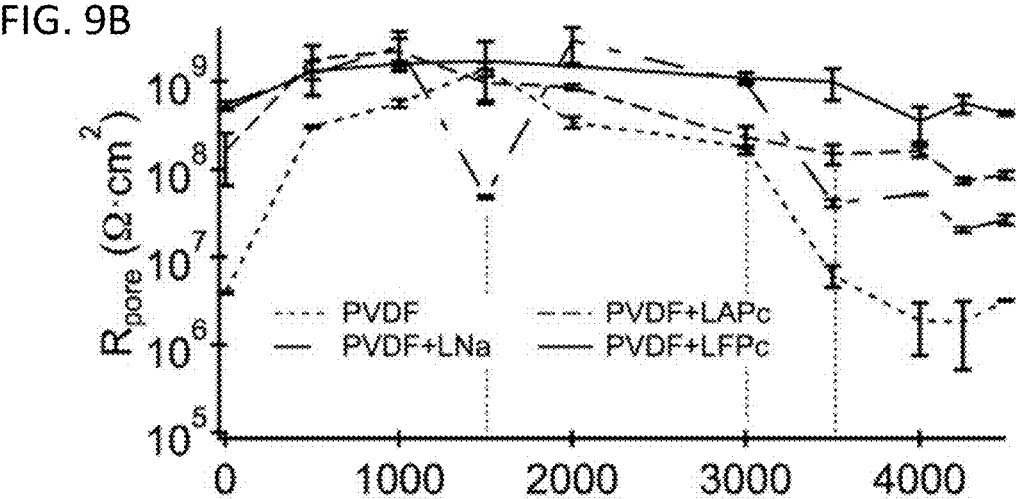
Figure 9C:
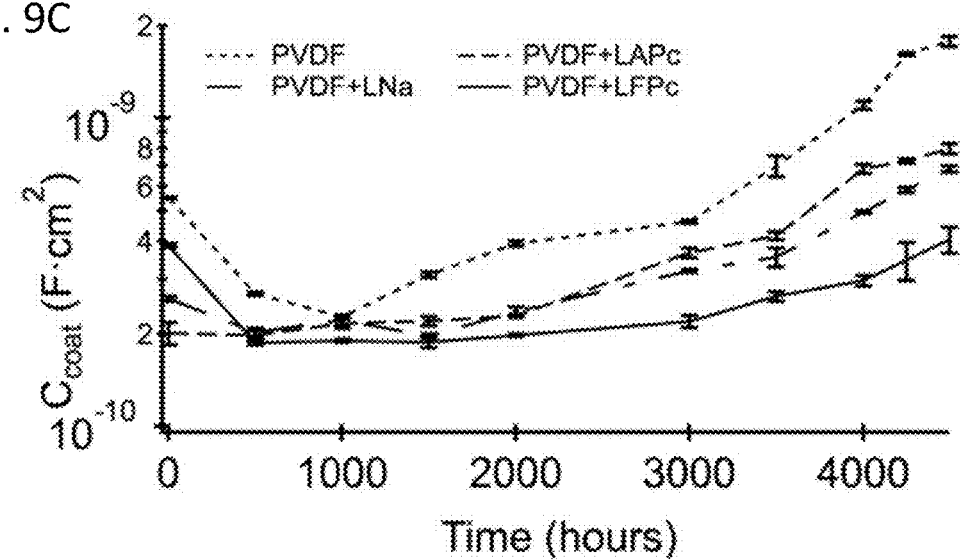
Figure 9D:
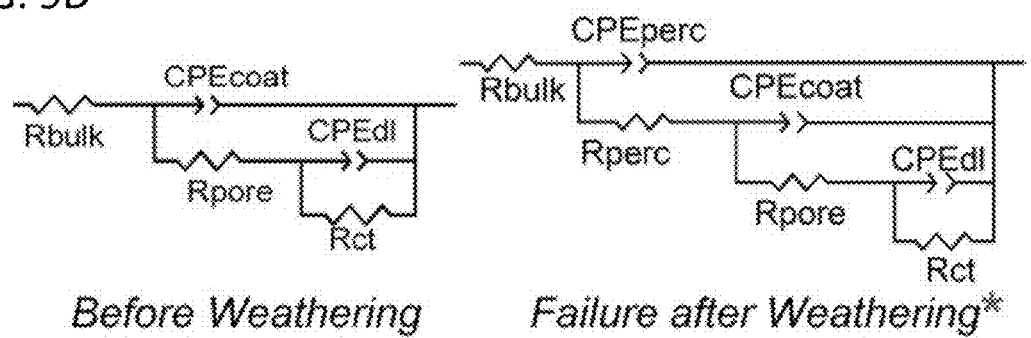

The term film resistance is useful to describe a film having number of pore channels that ions may travel through more quickly than they may through a film lacking such pores. The resistance of the full intact film ($R_{coat}$) is assumed to have a value much greater than the pore resistance and is not typically observed by experimental methods. Plotted for each coating over time in FIG. 9B, by 2000 hours of QUV-B weathering $R_{pore}$ had decreased from its maximum value in all composites. Coatings without clay and those with LNa showed partitioning of the film at advanced weathering times which was represented by a new time constant for a percolation layer, as shown in FIG. 9D. The final film resistances after 4500 hours QUV-B weathering were highest for the coating with LFPc ($R_{pore}$=442 MΩ), followed by LAPc ($R_{pore}$=87.1 MΩ), then LNa ($R_{perc}$=27.4 MΩ and $R_{pore}$=183 MΩ) and latex resin without nano-clay ($R_{perc}$=0.373 MΩ and $R_{pore}$=1.85 MΩ). The film with LFPc maintained a film resistance above 1 GΩ after 3500 hours of weathering and as thus was considered exceptional protection.

The polymer-only film showed the smallest relative pore resistance and largest relative coating capacitance, while the polymer with added LFPc showed the largest relative pore resistance and smallest relative coating capacitance. With the exception of the LFPc film, after a variable length of weathering, small spots of corrosion appeared on the coated substrates at the indicated time points (dashed lines) in FIG. 9B. Notably, the LNa film showed corrosion at the earliest time point (1500 h), possibly due to loss of the clay from that film. Additionally, each increase in impedance of the LNa film (2000 and 3500 hours) was accompanied by an increase in $R_{ct}$ which indicated a growing passivating layer of corrosion had filled the pores. Similar observations were made for LAPc at 4500 hours. Small layers of corrosion at the bottom of pore channels offered limited protection, as their resistance was eventually overcome during soaking studies. By all of these EIS measures, LFPc was the only coating that did not develop visible corrosion and had significantly better performance than the other films during accelerated weathering.

In general, it can be assumed that the resistance of the film drops as ion transport rises due to chemical degradation of the film (increased material permittivity). Resistance is not only related to a material's ability to transport charge, but also directly proportional to path length (here film thickness) and inversely proportional to area (here working electrode area). The observed decreases in film thickness may explain the later drop in $R_{pore}$ upon extended weathering, but this is in direct opposition to the initial observed increases up until 1500 hours. Accelerated weathering methods typically have a long UV step at an elevated temperature above the MFFT (here the UV step is run at 60° C. when MFFT$_{FMA}$=12° C.) and, without wishing to be bound by any particular theory, these steps may serve as continued annealing to provide limited repair for films retaining their flexibility throughout weathering. This maintained annealing drives out water from the film, promotes close packing and limited reorganization, all which decreased permittivity of the coatings.

Another measure of a film's ability to prevent corrosion is the time constant ($T_{coat}$=$C_{coat}$·$R_{pore}$). The combined product of capacitance and resistance of a protective coating can also be considered the relaxation time of the film after polarization and provides an average time for charge transport through the film to the metal surface. The initial time constant of the films did not follow the same trend as $C_{coat}$ nor $R_{pore}$ and are ordered from shortest to longest: PVDF without clay (2.2 ms), LAPc (33.0 ms), LNa (144.7 ms), and LFPc (185.5 ms). After 4500 hours of weathering, $T_{coat}$ decreased and is ordered from shortest to longest as follows: PVDF (0.0059 ms), LNa (18.7 ms), LAPc (69.2 ms), and LFPc (188.7 ms). Given the very small capacitances of these films in the pico- to nano-Farad range, the magnitude of the resistive components has a greater contribution in determining the time and is thus more closely related to the permittivity (or resistivity or in-phase behavior) of the dielectric being studied. The RC time constants are correlated with the degree of exfoliation of clay (as determined by SAXS models, with the data shown in Table 4): the more the clays are exfoliated, the longer are the time constants of the final films. Both initially and throughout weathering, the resin-only film performed the poorest with respect to each circuit element and had the lowest overall barrier properties. Addition of any clay increased the time constant 5-45 times that of the polymer only coating.

Using maximum and minimum values from the time-course EIS spectra of key elements in the EEC in FIG. 9D, a metric for quantifying the electrochemical stress (ES) index within a film can be estimated (Bedoya et al., *Electrochim. Acta* 2014, 124:119-127), and is shown in equation 4:

$$ES=(\log [R_{pore(max)}/R_{pore(min)}]+\log [R_{ct(max)}/R_{ct(min)}]+ \log [C_{coat(max)}/C_{coat(min)}]+\log [C_{dl(max)}/C_{dl(min)}])/(\log 1\times10^5) \quad (4)$$

In the ES index calculation, a resulting value close to zero indicates low stress while a value of 3 is the theoretical maximum. By this metric, the PVDF resin (without nano-clay additives) had an ES=2.66 after 4500 hours of weathering, which was the largest stress index in the study and makes this coating the least weatherable. Incorporation of nano-clays had positive effects on reducing the stress index of the material: the unmodified clay LNa had an ES=1.48 and films with modified clays showed even smaller changes where ES=0.993 for LAPc and ES=0.987 for LFPc. From these data, incorporation of nano-clays reduces the stress index of this PVDF coating, while the magnitude of that change was dependent on the chemical-modification of the nano-clay.

Figure 10:
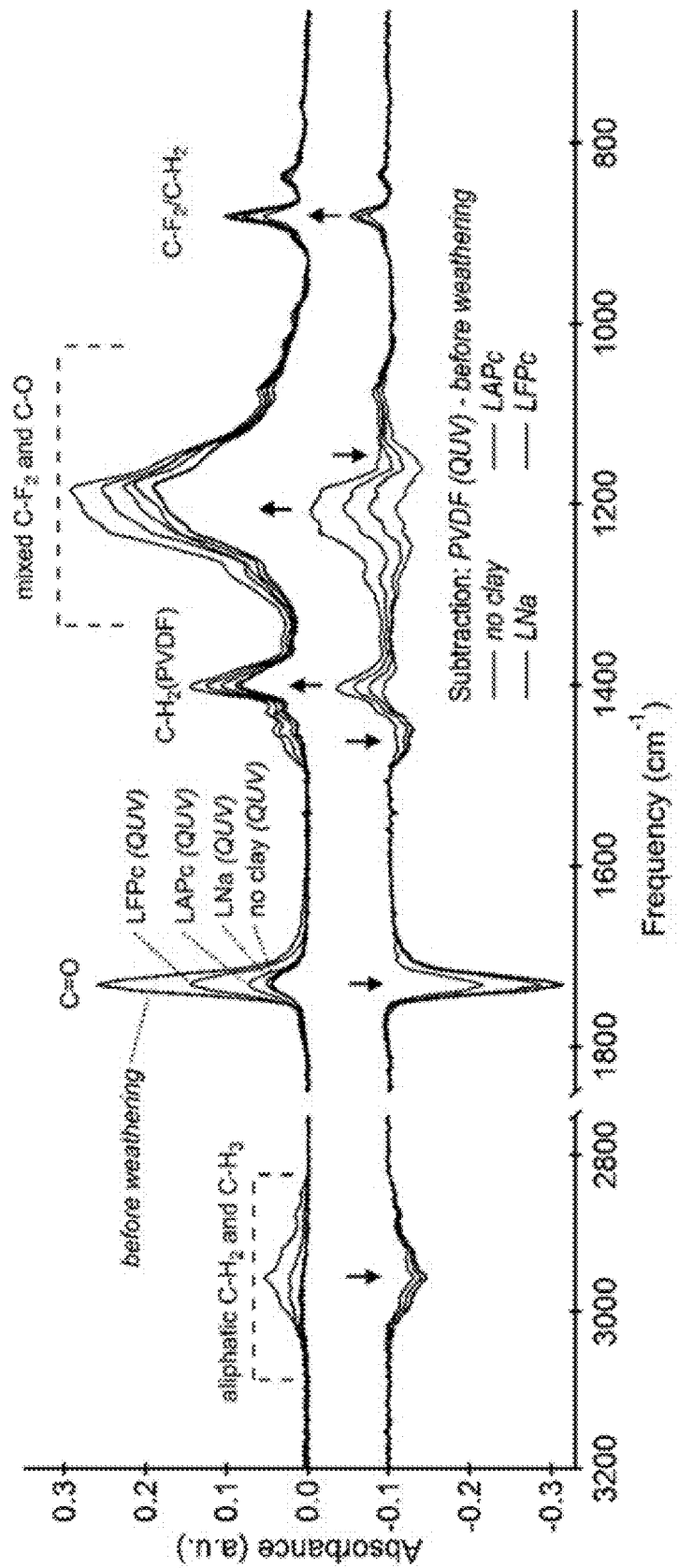
FIG. 10 shows FTIR-ATR spectra of coated bronze panels before and after 4000 h weathering in an accelerated weathering tester (QUV® weathering tester, Q-Lab Corporation, Westlake, Ohio). The subtraction results were produced from the weathered minus the initial (before weathering) spectrum, and are vertically offset by −0.1 a.u. for visual clarity.

The data presented thus far showed that the addition of chemically-modified nano-clays have significant improvements on the barrier properties, both short and long-term, of an already highly weatherable coating. An ATR-FTIR study showed that acrylic side-groups from the polymer were lost with weathering, as can be seen in the subtraction spectra of PVDF-acrylic films shown in FIG. 10, and that the losses were not equal across all films. FIG. 10 shows significant erosion of the acrylic component of the latex coating with simultaneous enrichment of all PVDF associated vibrations. Coating surfaces are particularly sensitive to photodegradation and typically a loss of film thickness during weathering corresponds to a simultaneous decrease in barrier properties. In FIGS. 9A-9C, an increase in barrier properties was observed over time, up to 3500 hours in the case of LFPc, even after the film had lost substantial thickness. Without wishing to be bound by any particular theory of operation, it was hypothesized that an increase in the number of impenetrable crystalline domains had occurred at the PVDF-rich surface of the film, ultimately increasing barrier properties.

It is useful to note that many of the degradation products of acrylic polymers are volatile and thus are not detected, especially near the surface. In the IR spectra, all of the negative peaks are associated with the acrylic portion of the resin while nearly all of the positive peaks are attributed to the PVDF portion of the resin. Specifically, the loss of acrylic is most readily observed in the large negative peak at 1731 cm$^{-1}$ associated with the carbonyl in the acrylate (a functional group that that is not present in PVDF). Additional loss of aliphatic methyl character was observed at 2989 cm$^{-1}$ ($CH_3$ $v_{as}$), 2877 cm$^{-1}$ ($CH_3$ $v_s$), and 1472/1435 cm$^{-1}$ ($CH_3$ $\delta_{as}$) while loss of aliphatic methylene character was observed at 2958 cm$^{-1}$ ($CH_2$ $v_{as}$), 2847 cm$^{-1}$ ($CH_2$ $v_s$), and 1450 cm$^{-1}$ ($CH_2$ $\delta$ scissor). The largest change in aliphatic groups occurred with a negative peak at 2926 cm$^{-1}$ and was assigned as a methylene stretching band. A variety of C—$F_2$ stretching vibrations were present from 1300-800 cm$^{-1}$, all positive in the subtraction spectra. Large positive peaks associated with the PVDF backbone were assigned to the $CH_2$ scissor mode (1400 cm$^{-1}$), $CF_2/CH_2$ twisting (882 cm$^{-1}$) and $CF_2/CH_2$ $_{skeletal}$-$\beta$ twisting (840 cm$^{-1}$). The increase in the PVDF vibrational modes indicate that component exists in greater proportions at the surface of the coating. In fact, after 4000 h, the ATR-FTIR spectrum indicated that the surfaces of the films without nano-clays were nearly devoid of any acrylic character in the polymer and were nearly purely PVDF. The smallest difference peaks by ATR-FTIR were observed for the fluoroalkyl clay composites.

Thin-film XRD spectra were obtained to investigate both the amount and quality of the composite films remaining after 3500 of weathering. The characteristic diffraction peaks of PVDF are shown for a weathered composite containing LF in FIG. 11A, where reflections of the TGTG' form of PVDF$^7$ produced peaks at 18.7°, 19.8°, and 26.5° 2$\Theta$. Since only an amorphous scattering halo can be clearly observed for PVDF (non-weathered), any sharpening of the aforementioned peaks would indicate an increase in the number and uniformity of PVDF crystalline domains. These same peaks were also present in spectra acquired using a thin-film geometry, which allowed for an in-situ investigation of the entire bulk film. A decreased intensity for each sample spectrum upon weathering confirmed loss of film thickness and sharpening of the duo peak at 18.7 2$\Theta$ confirmed increased PVDF crystallinity. The grazing-incidence data shown in FIG. 11B was acquired in a surface-sensitive geometry, and showed less overlap between the non-weathered and weathered films, also an indication of an increase in crystalline PVDF at the surface of the coating. Furthermore, the appearance of low-angle peaks at 4.2 and 6.3 2$\Theta$ correspond to the door spacings of LAPONITE clay, as discussed in previous sections. While these types of peaks would typically be unwanted in a composite (they indicate long-range stacking of pillars, as opposed to exfoliated discoids), the LF composite was the only film that showed diffraction peaks of nano-clay in-situ at any point in this study. Appearance of these peaks for the sample with LF as opposed to the other films indicated surface enrichment of not only PVDF but also the nano-clay, as chemical modification with FOTES may have increased particle retention in the coating.

Figures 11A, 11B:
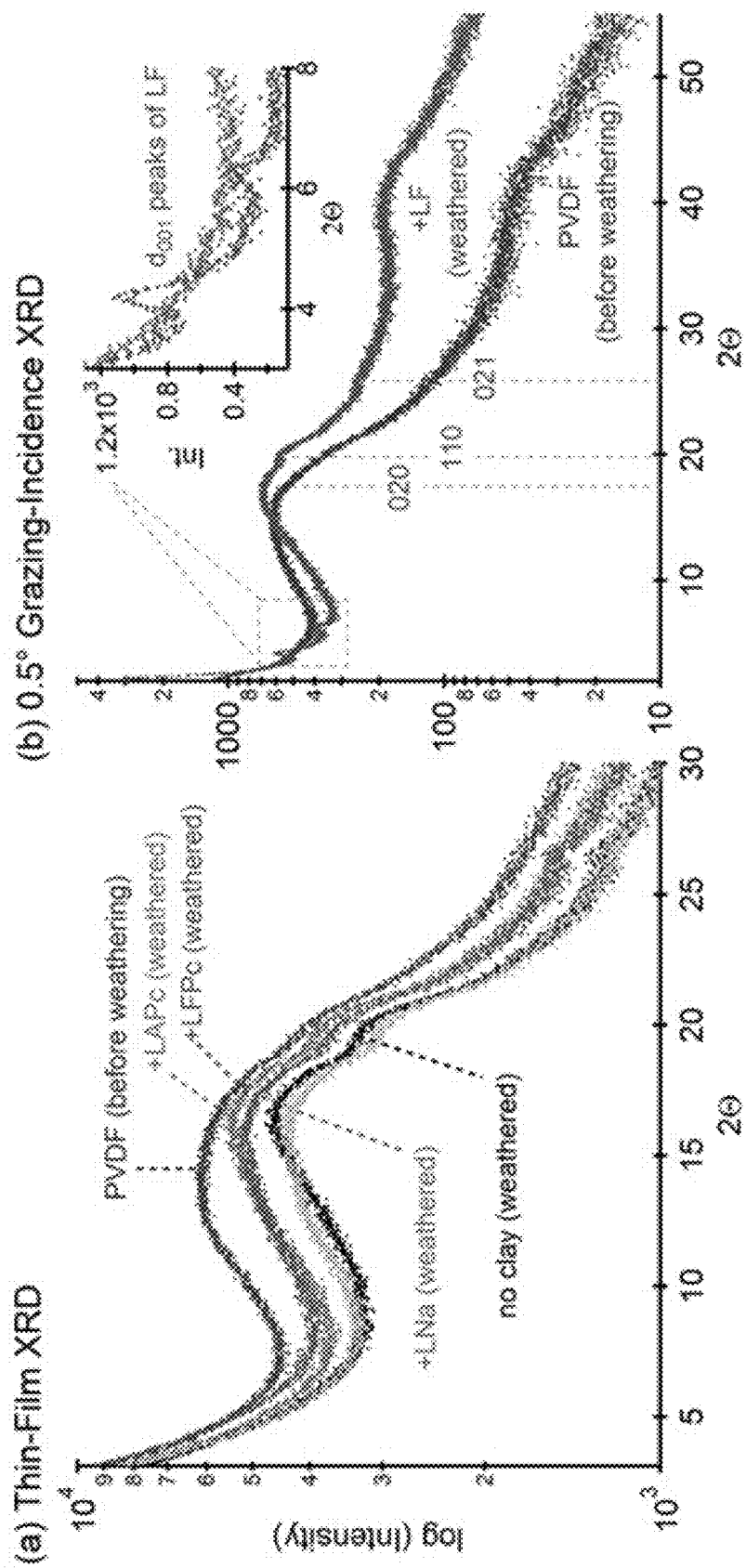
FIGS. 11A-11B show diffraction spectra of PVDF-LAPONITE clay composites weathered by QUV® accelerated weathering tester for 3500 hours with thin-film spectra showing increased PVDF crystallinity at 18.7 and 19.8 2Θ after weathering (FIG. 11A) and grazing incidence (0.5°) of non-weathered PVDF compared to PVDF+LF showing both surface enrichment of modified clay LF with door spacings at 4.2° and 6.3° 2Θ as well as increased PVDF crystallinity with reflections at 18.7° ($d_{020}$), 19.8° ($d_{110}$), and 26.5° ($d_{021}$) 2Θ (FIG. 11B).

Surface ablation of the coatings was confirmed by TF-XRD. The spectra of FIGS. 11A and 11B show a two important features: (1) a loss of film thickness and (2)

surface enrichment of crystalline PVDF. The film that thinned most and showed the greatest increase in PVDF crystallinity after weathering was the polymer only film. TF-XRD data also showed that addition of nano-clays reduced loss and changes in polymer film crystallinity. Material loss can also be monitored by relative changes in film thickness and gloss measurements, data for which are listed in Table 5 for each coating after weathering by QUV. Contrary to what was predicted, addition of the LNa clay did not appreciably affect gloss of the PVDF coating before or after weathering, but slightly prevented film loss over time. LFPc films had the lowest initial gloss compared to all of the other films (having a more matte appearance is often considered to be an aesthetic improvement for coatings, to reduce glare). LFPc films also showed the least change in gloss and the smallest change in film thickness (<30%) after weathering. Since the chemical functionality of the APTMS silane is more similar to that of the ester pendant groups in the acrylic resin, modified LAPc clays may be more susceptible to chemical degradation than clays of LFPc. If LAPc loses chemical functionality, the clay could be washed out from the coating matrix, resulting in a loss of the film due to the loss of radical quenchers in the clay.

TABLE 5

Gloss and thickness of the films before and after 4000 hours QUV-B

|  | Gloss (% R) Initial | Gloss (% ΔR) QUV ® 4k h | Thickness (% ΔD) QUV 4k h |
| --- | --- | --- | --- |
| PVDF | 12.6 ± 1.1 | −33.3 ± 2.9 | −36.5 ± 9.8 |
| PVDF + LNa | 12.6 ± 0.3 | −35.7 ± 0.96 | −29.4 ± 8.5 |
| PVDF + LAPc | 13.2 ± 0.4 | −37.9 ± 1.2 | −43.3 ± 7.5 |
| PVDF + LFPc | 9.1 ± 0.2 | −13.2 ± 0.44 | −23.1 ± 2.1 |

Structural changes in the polymer that result in an increase in the crystallinity should give rise to a film that has excellent barrier properties. Based on the ATR-FTIR data, the percentage of PVDF at the surface increased to near purity during weathering, and on the basis of TF-XRD data, the films became more crystalline. The EIS stability of particularly the LFPc film during weathering suggests that the films weather into two-phases: 1) microcrystalline PVDF enriched domains and 2) nanocrystalline modified clays, with both phases having electrolyte/corrosive impenetrable crystalline domains.

Figure 12:
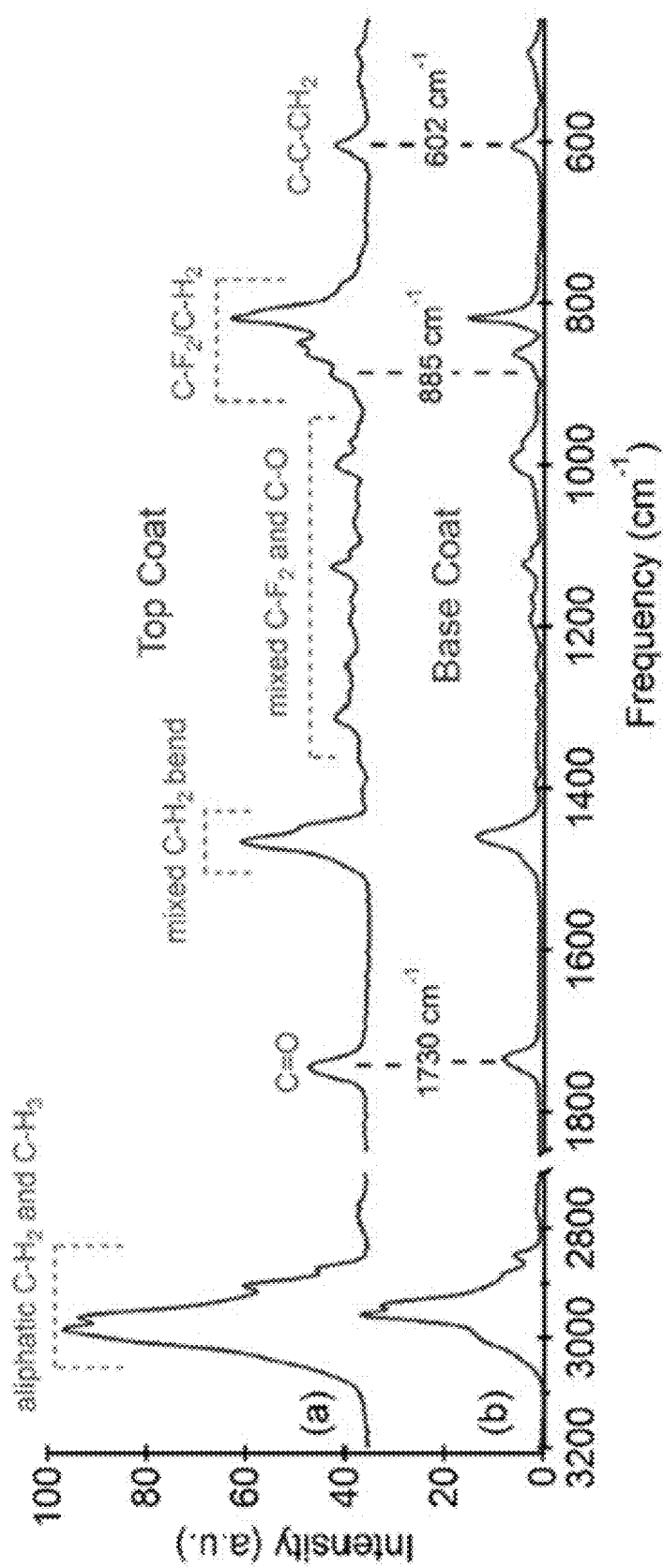
FIG. 12 shows Raman spectra before weathering of a PVDF/acrylic top coat and an acrylic PMMA/PEA primer coat normalized to the band at 602 cm$^{-1}$ (δ C—C).
Figures 13D, 13E, 13F:
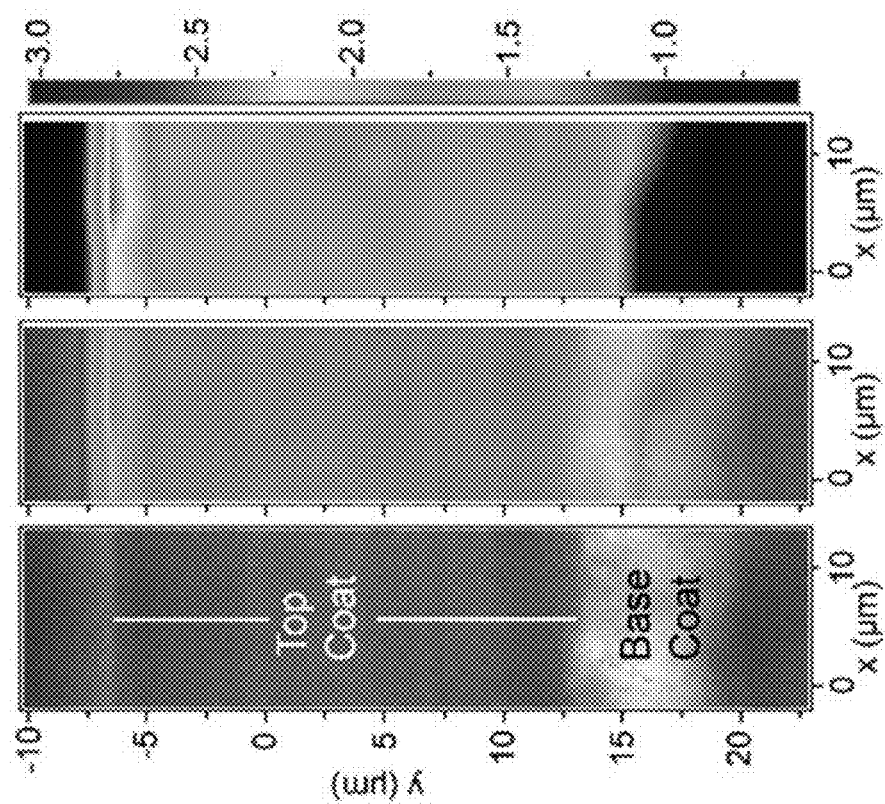
FIGS. 13A-13F show cross-sections of weathered PVDF (13A-13C) and PVDF+LNa (13D-13F) that were mapped by Raman spectroscopy.
Figures 13A, 13B, 13C:
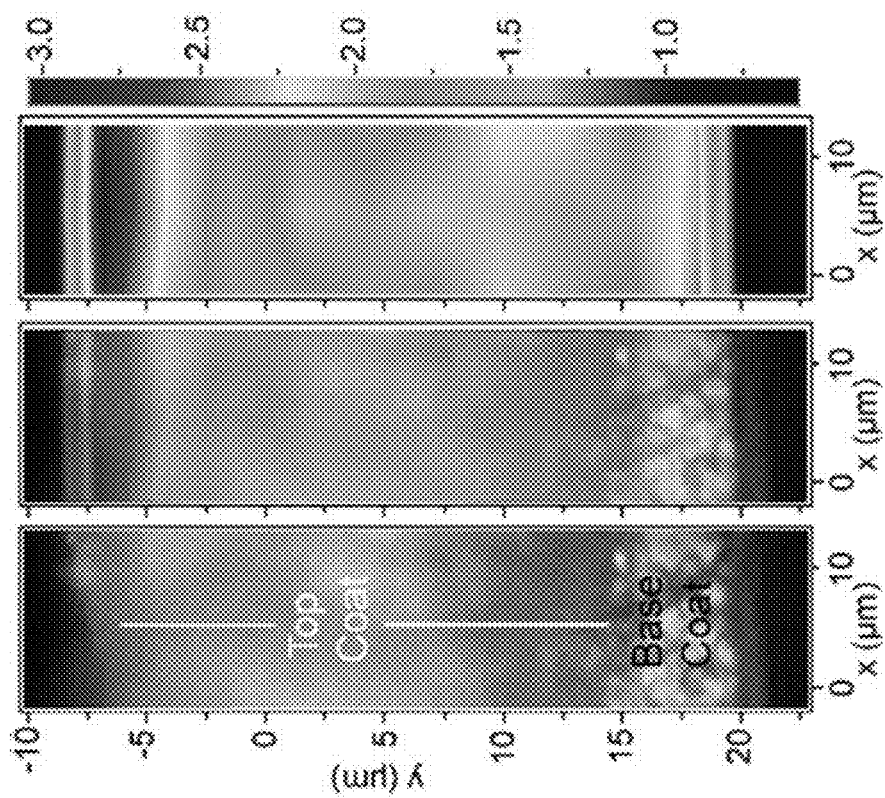

It is also likely that the nano-clays might (1) both absorb and scatter incoming UV radiation, thus minimizing the amount penetrating the coating, and (2) reduce photodegradation-induced mass transport out of the film. Raman microscopy was used to investigate these features and produce cross-section maps of a polymer-only film and a polymer+LNa film after weathering. FIG. 12 shows Raman spectra before weathering of the PVDF/acrylic topcoat (spectrum a) and acrylic PMMA/PEA primer coat (spectrum b) normalized to the band at 602 cm$^{-1}$ (δ C—C). Cross-sections of weathered PVDF (FIG. 13A) and PVDF+LNa (FIG. 13D) were mapped by Raman spectroscopy, and the intensity ratios of key PVDF/acrylic stretching bands are plotted ($I_{885}/I_{1730}$) in FIGS. 13C and 13H. For comparison, the Raman maps were superimposed over white light images of the cross-sections in FIGS. 13B and 13E. After normalization, the maximum intensity ratio was 3.0 and the minimum was 0.5. Measured intensities were smoothed in both x and y directions to create a cohesive map; the blue fringes at the top and bottom are artifacts of smoothing to zero. The polymer-only film (FIGS. 13A-13C) showed a higher intensity (concentration) and a thicker enriched layer of PVDF in the film (or, conversely, the acrylic-depleted layer was thicker) compared with the nanocomposite film (FIGS. 13D-13F) after weathering for 4500 h. The acrylic base coat was significantly degraded and embrittled when a polymer-only top coat was used as can be observed by the cracks in the lower portion of the cross-section in FIG. 13A and by the accompanying heat map of the ratio of key PVDF/acrylic Raman peaks (FIGS. 13B, 13C).

Overall, LFPc provided superior results compared to LAPc composite films during weathering. Without wishing to be bound by a particular theory of operation, it seems likely that the interaction between the polymer resin and the organo-functionalized clays may play a substantial role. The latex polymer used in these studies was synthesized in a core-shell synthesis, with both the core and the shell having both, but differing amounts of acrylic and PVDF components. To enable dispersion in aqueous media, the shell has a greater percentage of acrylic (hydrophilic) than the core does. Given that the best barrier properties were seen in films with added LFPc, it is possible that the LFPc clays facilitate the formation of an interpenetrating polymer network better than those with LAPc.

Good stability (chemical and mechanical) was observed by the low stress-index of chemically modified clays in the PVDF/acrylic films. Chemical modification of clays resulted in clays that retained their ability to be exfoliated and improved their dispersability in this highly weatherable resin. It is likely that the combination of the microstructural arrangement of clay particles, the chemical compatibility between the perfluoroalkyl-modified clays and the PVDF portion of the resin, and the excellent weatherability of both perfluoroalkyl and PVDF functionalities account for the superior corrosion resistance of the LFPc composite films throughout weathering.

The data demonstrated that incorporating chemically modified nano-clays into films produced from aqueous dispersions of acrylic/PVDF lattices significantly improves the barrier properties of the films over both the short and long term. XPS and Raman data showed that (1) LAPONITE clay was covalently modified with FOTES and cation exchanged with Pc; (2) grafting efficiency was more than 100%, suggesting that each accessible hydroxyl along the clay rim was covalently bound to one FOTES molecule; (3) approximately more than 50% of the silanes remaining after washing were covalently cross-linked to other FOTES molecules, and (4) cation exchange with Pc increased the hydrophilicity of the covalently modified clay.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A modified nano-clay, comprising:
 a nano-clay platelet;
 a plurality of haloalkylalkoxysiloxy moieties covalently bonded to a first surface of the nano-clay platelet, the haloalkylalkoxysiloxy moieties having a general formula:

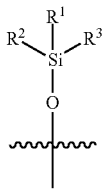

wherein R$^1$ is haloalkyl and R$^2$ and R$^3$ are lower alkoxy; and a plurality of polyatomic cations ionically bonded to a second surface of the nano-clay platelet, the polyatomic cations having displaced metal cations from the second surface of the nano-clay platelet and providing increased hydrophilicity of the modified nano-clay, wherein the polyatomic cations are phosphorylcholine, wherein the nano-clay platelet has a unit cell formula of Na$_{0.7}$[(Si$_8$Mg$_{5.5}$Li$_{0.3}$)O$_{20}$(OH)$_4$], and wherein the haloalkylalkoxysiloxy moieties are obtained from (tridecafluoro-1,1,2,2-tetrahydrooctyl) triethoxysilane.

2. A modified nano-clay, comprising:

a nano-clay platelet;

a plurality of haloalkylalkoxysiloxy moieties covalently bonded to a first surface of the nano-clay platelet, the haloalkylalkoxysiloxy moieties having a general formula:

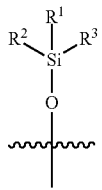

wherein R$^1$ is haloalkyl and R$^2$ and R$^3$ are lower alkoxy; and a plurality of polyatomic cations ionically bonded to a second surface of the nano-clay platelet, the polyatomic cations having displaced metal cations from the second surface of the nano-clay platelet and providing increased hydrophilicity of the modified nano-clay, wherein the polyatomic cations are phosphorylcholine, and wherein the modified nano-clay has a haloalkylalkoxysiloxy moiety grafting efficiency of at least 20%.

3. A coating composition, comprising:

polyvinylidene fluoride (PVDF);

poly(methyl methacrylate) (PMMA), wherein the PVDF and PMMA have a weight ratio within a range of 50/50 to 70/30; and 0.4-0.6 wt % of a modified nano-clay based on a total mass of the modified nano-clay, the PVDF, and the PMMA, wherein the modified nano-clay comprises platelets having a unit cell formula of Na$_{0.7}$[(Si$_8$Mg$_{5.5}$Li$_{0.3}$)O$_{20}$(OH)$_4$], a plurality of covalently bound haloalkylalkoxysiloxy moieties obtained from (tridecafluoro-1,1,2,2-tetrahydrooctyl)triethoxysilane, and a plurality of ionically bound phosphorylcholine ions.

4. The coating composition of claim 3, wherein:

(i) the coating composition comprises nanoparticles of PVDF and PMMA, the nanoparticles having an average particle size of 100-300 nm; or (ii) at least a portion of the modified nano-clay is disposed in voids between particles comprising PVDF and PMMA; or (iii) the coating composition is an aqueous dispersion of (a) the modified nano-clay and (b) nanoparticles comprising PVDF and PMMA; or (iv) any combination of (i), (ii), and (iii).

5. An object, comprising:

a metal component; and a protective coating on at least a portion of the metal component, the protective coating comprising a layer of the coating composition according to claim 4.

6. The object of claim 5, wherein the protective coating further comprises:

a layer of a primer base coat;

a layer of a top coat comprising PVDF; or a layer of a primer base coat and a layer of a top coat comprising PVDF, wherein each layer of the protective coating has an average thickness of 5-20 μm.

7. The object of claim 5, wherein the protective coating has:

(i) an average thickness of 20-40 μm;

(ii) an impedance of at least 3,000 MΩ·cm$^2$ at 0.1 Hz; or (iii) both (i) and (ii).

8. The object of claim 5, wherein the protective coating has:

(i) an initial impedance of at least 3000 MΩ·cm$^2$ at 0.1 Hz and an impedance of at least 1000 MΩ·cm$^2$ at 0.1 Hz after weathering for 4500 hours in an accelerated weathering tester;

(ii) an electrochemical stress index of less than 1.4 after weathering for 4500 hours in an accelerated weathering tester; or (iii) both (i) and (ii).

* * * * *